United States Patent
Ookawara

(10) Patent No.: US 11,654,905 B2
(45) Date of Patent: May 23, 2023

(54) ADAPTIVE ACCELERATION CONTROL SYSTEMS AND METHODS

(71) Applicant: SUBARU CORPORATION, Tokyo (JP)

(72) Inventor: Junichi Ookawara, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 157 days.

(21) Appl. No.: 17/105,128

(22) Filed: Nov. 25, 2020

(65) Prior Publication Data

US 2022/0161796 A1 May 26, 2022

(51) Int. Cl.
*B60W 30/14* (2006.01)
*B60W 50/00* (2006.01)

(52) U.S. Cl.
CPC .......... *B60W 30/143* (2013.01); *B60W 50/00* (2013.01); *B60W 2050/0026* (2013.01); *B60W 2050/0088* (2013.01); *B60W 2540/10* (2013.01); *B60W 2720/10* (2013.01); *B60W 2720/106* (2013.01)

(58) Field of Classification Search
CPC ............... B60W 30/143; B60W 50/00; B60W 2050/0026; B60W 2050/0088; B60W 2540/10; B60W 2720/10; B60W 2720/106
See application file for complete search history.

(56) References Cited

U.S. PATENT DOCUMENTS

2020/0339081 A1 10/2020 Suzuki et al.
2021/0053589 A1* 2/2021 Mizoguchi ........ B60W 60/0053

FOREIGN PATENT DOCUMENTS

| JP | 2006-138266 A | | 6/2006 | |
|---|---|---|---|---|
| JP | 2006138266 A | * | 6/2006 | |
| JP | 2019-068625 A | | 4/2019 | |
| JP | 2019-126148 A | | 7/2019 | |
| JP | 2019217997 A | * | 12/2019 | .......... B60W 30/045 |

OTHER PUBLICATIONS

Machine translation of JP-2019217997-A (Year: 2019).*
Machine translation of JP-2006138266-A (Year: 2006).*

* cited by examiner

*Primary Examiner* — Jason Holloway
*Assistant Examiner* — Mohamad O El Sayah
(74) *Attorney, Agent, or Firm* — McDermott Will & Emery LLP

(57) ABSTRACT

Aspects of the subject technology relate to systems and methods for adaptively controlling acceleration of a vehicle employing one pedal driving functionality. A full release of an accelerator pedal of a vehicle is detected while the vehicle travels at a first non-zero speed according to a default accelerator pedal map. When the full release of the accelerator pedal is detected, the vehicle decelerates, and the first accelerator pedal map is switched to an adaptive accelerator pedal map. While the vehicle decelerates, the adaptive accelerator pedal map is adjusted according to reduction of a speed of the vehicle. When a depression of the accelerator pedal to reaccelerate the vehicle pedal is detected while the vehicle decelerates and before the speed of the vehicle reaches zero, the vehicle is controlled to reaccelerate the vehicle according to the adjusted adaptive accelerator pedal map without further decelerating the vehicle.

16 Claims, 13 Drawing Sheets

100

200A

200B

300A

300C

300D

400A

400C

400D

500A

500C

500D

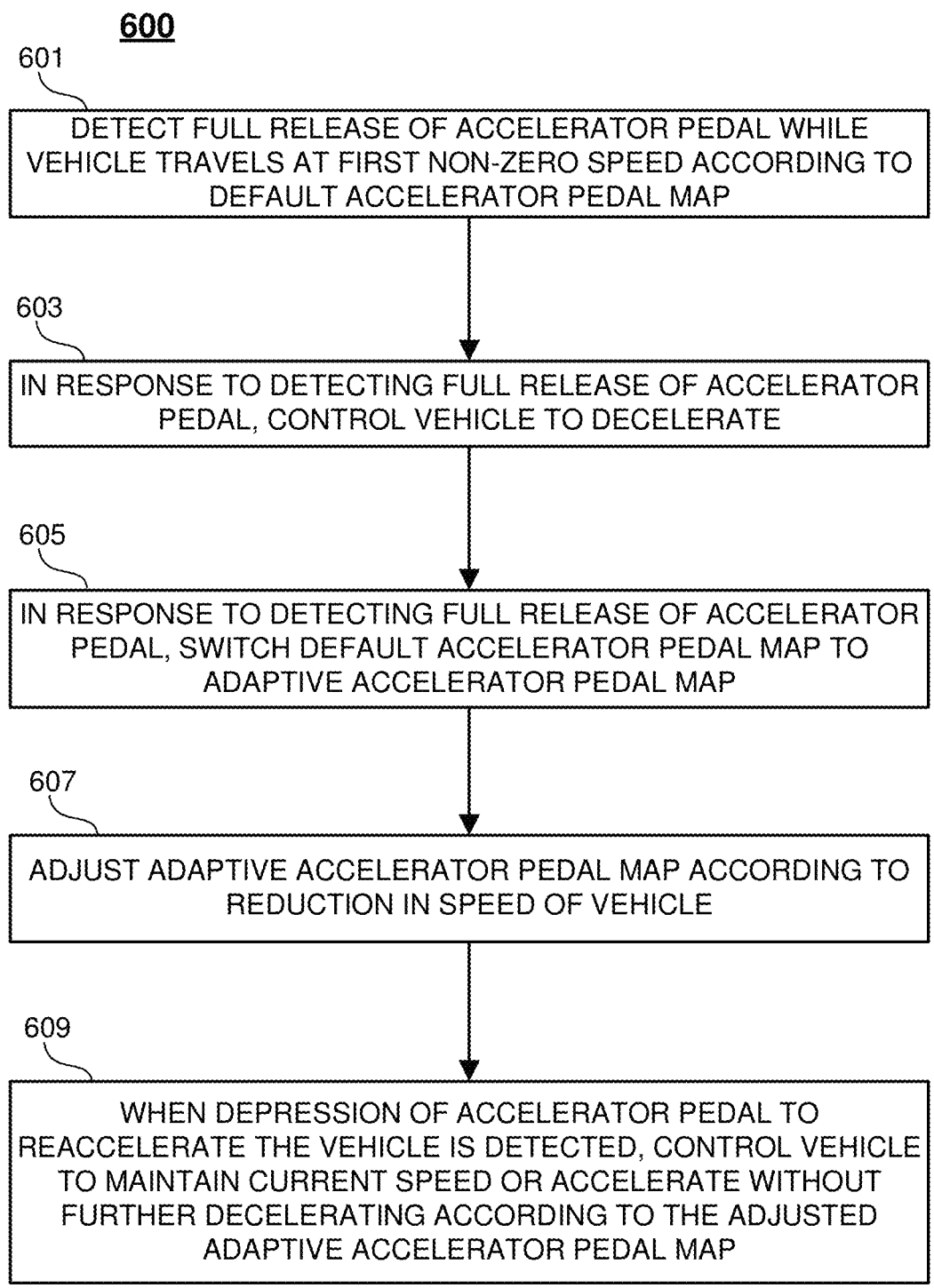

900A

ADAPTIVE ACCELERATION CONTROL SYSTEMS AND METHODS

BACKGROUND

Field

The present disclosure generally relates to vehicle control systems and methods, and more particularly to adaptive acceleration control systems and methods.

Description of the Related Art

Vehicles such as electric vehicles and hybrid vehicles achieve high fuel mileage and low vehicle emission by using a battery-powered electric motor/generator. Some vehicles use regenerative braking systems to convert kinetic energy produced during vehicle braking into electric energy to be stored in a battery pack for future use by the battery-powered electric motor/generator. Regenerative braking systems provide for one pedal driving functionality. One pedal driving functionality uses a single pedal (i.e., an accelerator pedal) of the vehicle to perform acceleration and deceleration using regenerative braking. For example, one pedal driving functionality allows a vehicle to accelerate and/or maintain a constant speed when an accelerator pedal of the vehicle is depressed, and further allows the vehicle to decelerate and/or stop by applying a regenerative braking force when the accelerator pedal is released. In case of emergency, a brake pedal of the vehicle may be depressed to more quickly decelerate and/or stop the vehicle by applying friction braking force while the vehicle exerts deceleration using the regenerative braking.

The description provided in the background section should not be assumed to be prior art merely because it is mentioned in or associated with the background section. The background section may include information that describes one or more aspects of the subject technology.

SUMMARY

The disclosed subject matter relates to systems and methods for adaptively controlling acceleration in a vehicle employing one pedal driving functionality.

In accordance with various aspects of the subject disclosure, a computer-implemented method, is provided that includes detecting a full release of an accelerator pedal of a vehicle while the vehicle travels at a first non-zero speed according to a default accelerator pedal map. When an accelerator pedal of the vehicle is in the acceleration range, the vehicle accelerates. In response to detecting the full release of the accelerator pedal while the vehicle travels at the first non-zero speed, the vehicle is controlled to decelerate, and the default accelerator pedal map is switched to an adaptive accelerator pedal map. The adaptive accelerator pedal map is different from the default accelerator pedal map. While the vehicle decelerates from the first non-zero speed, the adaptive accelerator pedal map is adjusted according to reduction of a speed of the vehicle. When a depression of the accelerator pedal to reaccelerate the vehicle pedal is detected at a second non-zero speed while the vehicle decelerates and before the speed of the vehicle reaches zero, the vehicle is controlled to maintain a current speed of the vehicle or reaccelerate the vehicle according to the adjusted adaptive accelerator pedal map without further decelerating the vehicle. The second non-zero speed is slower than the first non-zero speed.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 6 illustrates an exemplary process for switching from default accelerator pedal map to adaptive accelerator pedal map according to example aspects of the subject technology;

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Vehicles, such as electric vehicles and hybrid vehicles, may be equipped with one pedal driving functionality that allows a single pedal (i.e., accelerator pedal) of the vehicle to perform both acceleration and deceleration. Existing one pedal driving functionality uses a single accelerator pedal map, such as an accelerator pedal map 900A shown in FIG. 9A, when performing acceleration and deceleration of the vehicle with one pedal driving functionality.

Figure 9A:
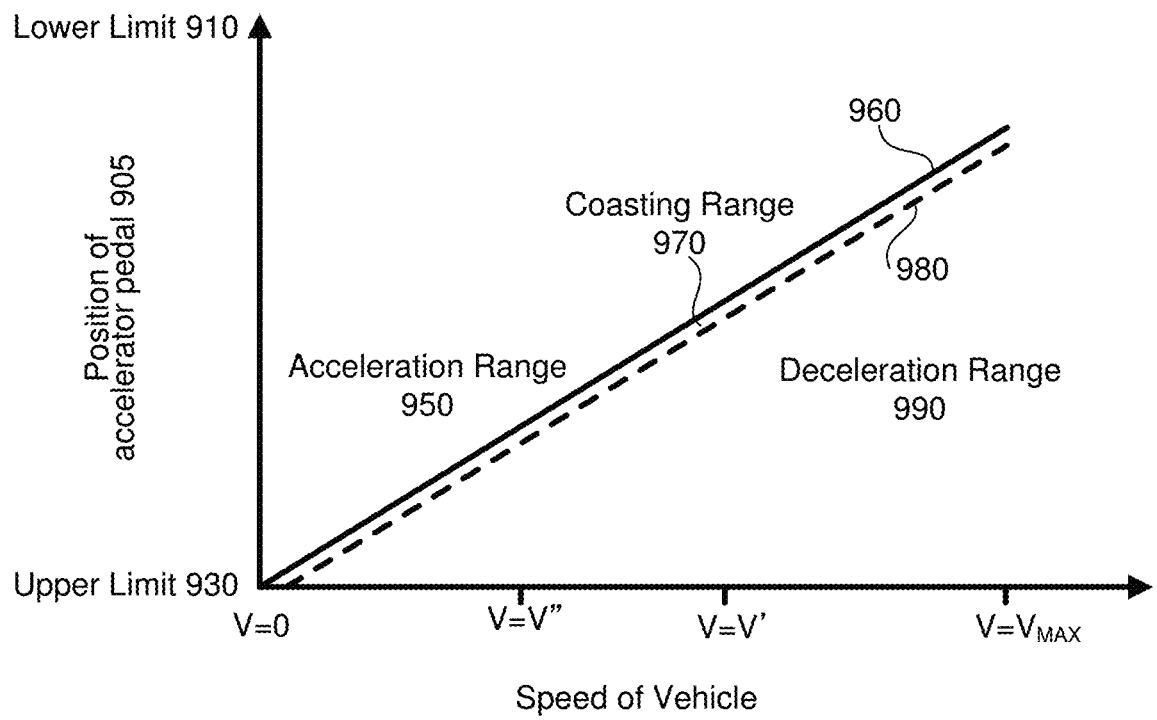
FIGS. 9A and 9B illustrate an example accelerator pedal map according to a conventional one pedal driving functionality.

As shown in FIG. 9A, accelerator pedal map 900A is a linear accelerator pedal map. The x-axis of accelerator pedal map 900A represents a speed of the vehicle, where a speed V=0 indicates zero speed or standstill, a speed $V=V_{MAX}$ indicates the maximum speed that the vehicle is capable of traveling at, and a speed V=V" and a speed V=V' indicate the speeds between the speed V=0 and the speed $V=V_{MAX}$. The y-axis of accelerator pedal map 900A represents a position (i.e., degree of depression) of an accelerator pedal 905 (see FIG. 9B) of the vehicle where lower limit 910 represents the lowest point to which accelerator pedal 905 can be depressed and upper limit 930 represents a point at which accelerator pedal 905 is positioned when accelerator pedal 905 is fully released. Accelerator pedal map 900A includes an acceleration range 950, a coasting range 970, and a deceleration range 990. Acceleration range 950 and coasting range 970 are separated from one another by an acceleration/coasting boundary 960 (i.e., solid line). Coasting range 970 and deceleration range 990 are separated from one another by a coasting/deceleration boundary 980 (i.e., dotted line).

The vehicle accelerates when a position of accelerator pedal 905 falls within acceleration range 950. For example, when a driver of the vehicle depresses accelerator pedal 905 from a fully released position (i.e., upper limit 930), the position of accelerator pedal 905 falls within acceleration range 950 causing the vehicle to accelerate.

The vehicle maintains a constant speed when the position of accelerator pedal 905 falls within coasting range 970. For example, while the vehicle is traveling at V=V", the driver may partially release the depressed accelerator pedal 905 causing the position of accelerator pedal 905 to fall within coasting range 970. This allows the vehicle to maintain the speed of V=V".

The vehicle decelerates when the position of accelerator pedal 905 falls within deceleration range 990. For example, while the vehicle is traveling at V=V', the driver may release the depressed accelerator pedal 905 causing the position of accelerator pedal 905 to pass coasting range 970 and fall within deceleration range 990. When the position of accelerator pedal 905 is in deceleration range 990, a regenerative braking force is applied to the vehicle causing the vehicle to decelerate.

In addition to an accelerator pedal (i.e., accelerator pedal 905), vehicles equipped with one pedal driving functionality may also be equipped with a brake pedal for emergency braking typically used to avoid collisions. For example, when the regenerative braking force may not be enough to decelerate and/or stop the vehicle to avoid collisions, the driver may depress the brake pedal to apply friction braking force to more quickly decelerate and/or stop the vehicle than when using only the regenerative braking force to decelerate and/or stop the vehicle to avoid collisions.

These configurations provide enhanced fuel economy while providing further safety measures. However, in electric vehicles and hybrid vehicles that employ the existing one pedal driving functionality, an issue of response delay or free-play arises during reacceleration performed after the vehicle decelerates. The issue of response delay or free-play will be described using accelerator pedal map 900A in FIG. 9A.

The existing one pedal driving functionality relies on a single accelerator pedal map, such as accelerator pedal map 900A. For example, while the vehicle is at standstill (i.e., V=0), the driver of the vehicle may depress accelerator pedal 905 from a fully released position (i.e., upper limit 930). This causes the position of accelerator pedal 905 to fall within acceleration range 950 in accelerator pedal map 900A causing the vehicle to accelerate.

When the driver sees a preceding vehicle slow down while the vehicle is traveling at the speed of V=V', the driver fully releases accelerator pedal 905 to decelerate the vehicle to adjust the speed of the vehicle to the preceding vehicle slowing down. Fully releasing accelerator pedal 905 places the position of accelerator pedal 905 at the fully released position (i.e., at upper limit 930), and further causes the vehicle to decelerate. When the vehicle decelerates from the speed of V=V' to the speed of V=V", the preceding vehicle stops decelerating and starts reaccelerating. Seeing the preceding vehicle reaccelerated, the driver of the vehicle may depress accelerator pedal 905 again to reaccelerate while the vehicle is traveling at the speed of V=V".

Figure 9B:
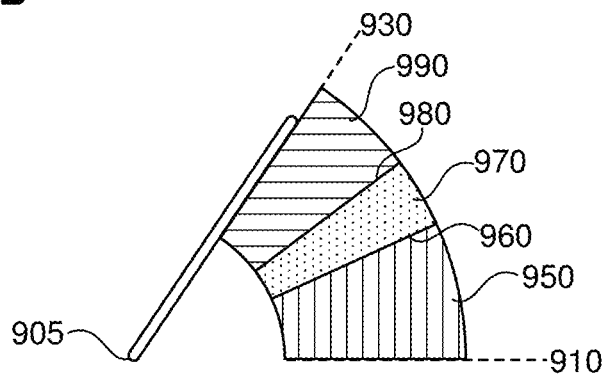

FIG. 9B depicts a state in which accelerator pedal 905 is fully released while the vehicle travels at the speed of V=V". The ranges (i.e., acceleration range 950, coasting range 970, and deceleration range 990) in accelerator pedal map 900A are mapped along a stroke of the accelerator pedal 905. As shown in FIG. 9B, when accelerator pedal 905 is depressed from the fully released position (i.e., at upper limit 930) while the vehicle is traveling at the speed of V=V", accelerator pedal 905 must move through deceleration range 990 and coasting range 970 before reaching acceleration range 950 to reaccelerate the vehicle. Since the vehicle is designed to decelerate while accelerator pedal 905 is in deceleration range 990 which accelerator pedal 905 must move through to reach acceleration range 950, the vehicle decelerates despite the fact that the driver is depressing accelerator pedal 905. This is also true for when the vehicle reaccelerates immediately following the use of friction braking to decelerate the vehicle. This is because before depressing the brake pedal to apply the friction braking, accelerator pedal 905 is generally fully released.

From the past experiences, drivers expect vehicles to accelerate when the accelerator pedal is depressed. However, in the existing one pedal functionality, even when the driver depresses accelerator pedal 905, the vehicle continues to decelerate, as described above. The discrepancy between the driver's expectation (i.e., vehicle accelerating) of the response of the vehicle when depressing accelerator pedal 905 and the actual response of the vehicle (i.e., vehicle decelerating) is referred to as a response delay or free-play.

To address the above technical problems, the subject technology provides technical solutions of providing systems and methods for adaptively controlling reacceleration of a vehicle employing one pedal driving functionality. The disclosed techniques provide for minimizing a response delay or free-play during reacceleration of vehicles employing one pedal driving functionality by providing a default accelerator pedal map and an adaptive accelerator pedal map for one pedal driving functionality, wherein the adaptive accelerator pedal map allows for adaptively adjusting the ranges in the adaptive accelerator map based on the vehicle state. The disclosed techniques further provide for seamless transitions between the default accelerator pedal map and the adaptive accelerator pedal map.

Figure 1:
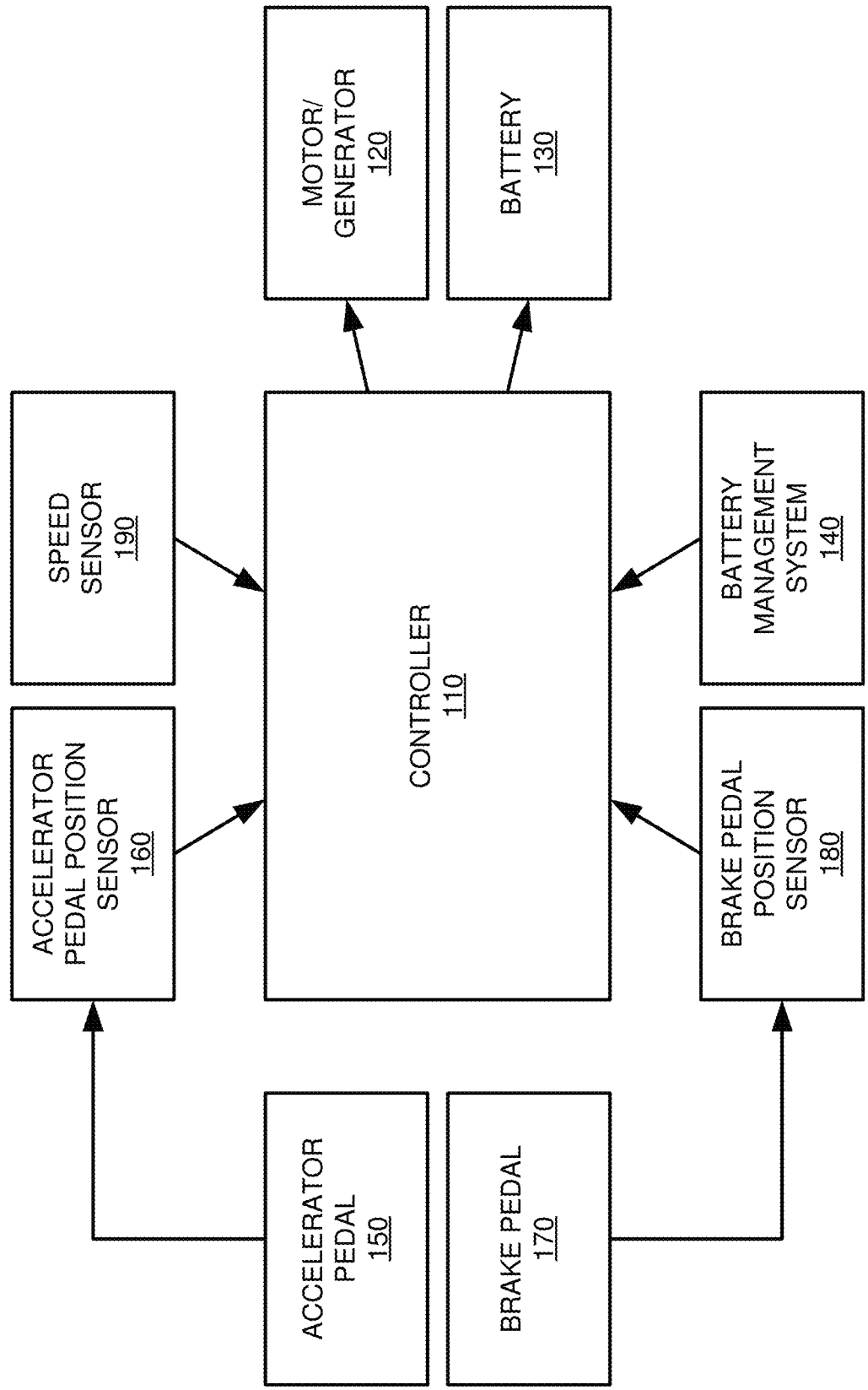
FIG. 1 depicts a block diagram of an exemplary powertrain system of a vehicle according to example aspects of the subject technology.

FIG. 1 depicts a block diagram of an exemplary powertrain system 100 of a vehicle according to example aspects of the subject technology. The vehicle may be an electric vehicle or a hybrid vehicle equipped with one pedal driving functionality. As shown in FIG. 1, powertrain system 100 includes a controller 110, a motor/generator 120, a battery 130, a battery management system 140, an accelerator pedal 150, an accelerator pedal position sensor 160, a brake pedal 170, a brake pedal position sensor 180, and a speed sensor 190.

Controller 110 may be a powertrain control unit (PCU) that receives data from battery management system 140, accelerator pedal position sensor 160, brake pedal position sensor 180, and speed sensor 190. Controller 110 may control motor/generator 120 based on the received data to control the application of a torque to wheels of the vehicle. While illustrated as one controller, controller 110 may be part of a larger control system and may be controlled by various other controllers throughout the vehicle, such as a vehicle system controller.

Motor/generator 120 may be an electric motor or an electric generator that converts electric energy into mechanical power and also converts mechanical power into electric energy. Motor/generator 120 may be coupled to battery 130. Motor/generator 120 may convert the energy from battery 130 into mechanical power, and may provide energy back to battery 180, for example, from regenerative braking. Motor/generator 120 may perform power running operation providing the driving force to wheels of the vehicle or perform a regenerative operation providing the regenerative braking force to the wheels based on a command from controller 110. Motor/generator 120 includes an inverter (not shown) that converts the power of battery 130 and supplies the power to motor/generator 120 when motor/generator 120 performs power running operation. On the other hand, the inverter converts the power generated in motor/generator 120 and charges battery 180 when motor/generator 120 performs the regenerative operation.

Battery 130 stores electrical energy and is electrically connected to electric machine including motor/generator 120 of the vehicle. Battery management system 140 constantly monitors the state of charge (i.e., remaining charge) and the state of health (i.e., temperature) of battery 130, and communicates the state of charge and/or the state of health of battery 130 to controller 110. For example, the state of charge of battery 130 decreases if power from battery 130 is used to power the electric machines of the vehicle, and the state of charge of battery 130 increases if the electric machines supplies power to battery 130 via regenerative braking.

Based on the state of charge and/or the state of health of battery 130 communicated from battery management system 140, controller 110 transmits a command regarding the regenerative operation to motor/generator 120. For example, when the state of charge of battery 130 indicates the remaining charge in battery 130 is above a predetermined threshold and/or the state of health of battery 130 indicates the temperature of battery 130 is above a predetermined temperature, controller 110 may refrain from transmitting the regenerative operation command to motor/generator 120 to prohibit motor/generator 120 from performing the regenerative operation. In such a case, the vehicle decelerates using friction braking instead of regenerative braking. Yet in another example, when the state of charge of battery 130 indicates low charge remaining in battery 130 and the state of health of battery 130 indicates the temperature of battery 130 to be lower than a threshold, controller 110 may transmit the regenerative operation command to motor/generator 120 to perform the regenerative operation allowing regenerative braking to replenish charge in battery 130.

Accelerator pedal 150 allows a driver of the vehicle to adjust a speed of the vehicle. For example, the driver of the vehicle may depress accelerator pedal 150 to facilitate the vehicle to accelerate. The driver of the vehicle may release accelerator pedal 150 to decelerate the vehicle using a regenerative braking force. The driver of the vehicle may partially release accelerator pedal 150 to maintain the vehicle at a constant speed. Accelerator pedal position sensor 160 is connected to accelerator pedal 150 and senses a position of accelerator pedal 150 along the stroke of accelerator pedal 150 based on the depression or release of accelerator pedal 150. Accelerator pedal position sensor 160 transmits a signal indicative of the position of accelerator pedal 150 to controller 110. Controller 110 may store the transmitted position of accelerator pedal 150 for a predetermined time.

Based on the position of accelerator pedal 150 communicated to controller 110, controller 110 determines whether to accelerate the vehicle, decelerate the vehicle, or maintain a constant speed of the vehicle. For example, upon receiving the position of accelerator pedal 150, controller 110 refers to an accelerator pedal map that is mapped to the stroke of accelerator pedal 150. Referring to the accelerator pedal map, controller 110 may determine within which one of the ranges (e.g., acceleration range, coasting range, or deceleration range) in the accelerator pedal map the position of accelerator pedal 150 falls. Depending on which one of the ranges in the accelerator pedal map the position of accelerator pedal 150 falls within, controller 110 controls the vehicle to accelerate, maintain a constant speed, or decelerate.

Brake pedal 170 allows the driver of the vehicle to slow and/or stop the vehicle and provides for additional braking force in addition to the regenerative braking force. The driver of the vehicle depresses brake pedal 170 to slow and/or stop the vehicle using friction braking force when the vehicle is required to more quickly stop than using only the regenerative braking to slow and/or stop the vehicle. Brake pedal position sensor 180 senses the position of brake pedal 170 along the stroke of brake pedal 170 based on the degree of depression of brake pedal 170. Brake pedal position sensor 180 transmits a signal indicative of the position of brake pedal 170 to controller 110. Controller 110 may store the transmitted position of brake pedal 170 for a predetermined time.

Based on the position of brake pedal 170 communicated to controller 110, controller 110 may control the vehicle to apply the amount of friction braking corresponding to the communicated position of brake pedal 170 to decelerate and/or stop the vehicle using friction braking. The friction braking provides more rapid deceleration than the regenerative braking. For example, additional deceleration can be obtained by applying the friction braking.

Speed sensor 190 senses the speed of the vehicle and transmits the sensed speed to controller 110. For instance, speed sensor 190 may detect the rotational speed of the wheels of the vehicle and transmit, to controller 110, the detected rotational speed as the speed of the vehicle.

To minimize the response delay or the free-play during reacceleration of vehicles employing the one pedal driving functionality, controller 110 may store two or more accelerator pedal maps including a default accelerator pedal map and an adaptive accelerator pedal map. Controller 110 may select one of two or more accelerator pedal maps based on any combination of the position of accelerator pedal 150, the position of brake pedal 170, and the speed of the vehicle communicated to controller 110. Controller 110 refers to the selected one of the two or more accelerator pedal maps to control the vehicle to accelerate, maintain a constant speed, or decelerate. Further details about the selection of one of the two or more accelerator pedal maps and a range arrangement within each of the two or more accelerator pedal maps will be described with reference to FIGS. 2A-2F, 3A-3D, 4A-4D, and 5A-5D.

Figure 2A:
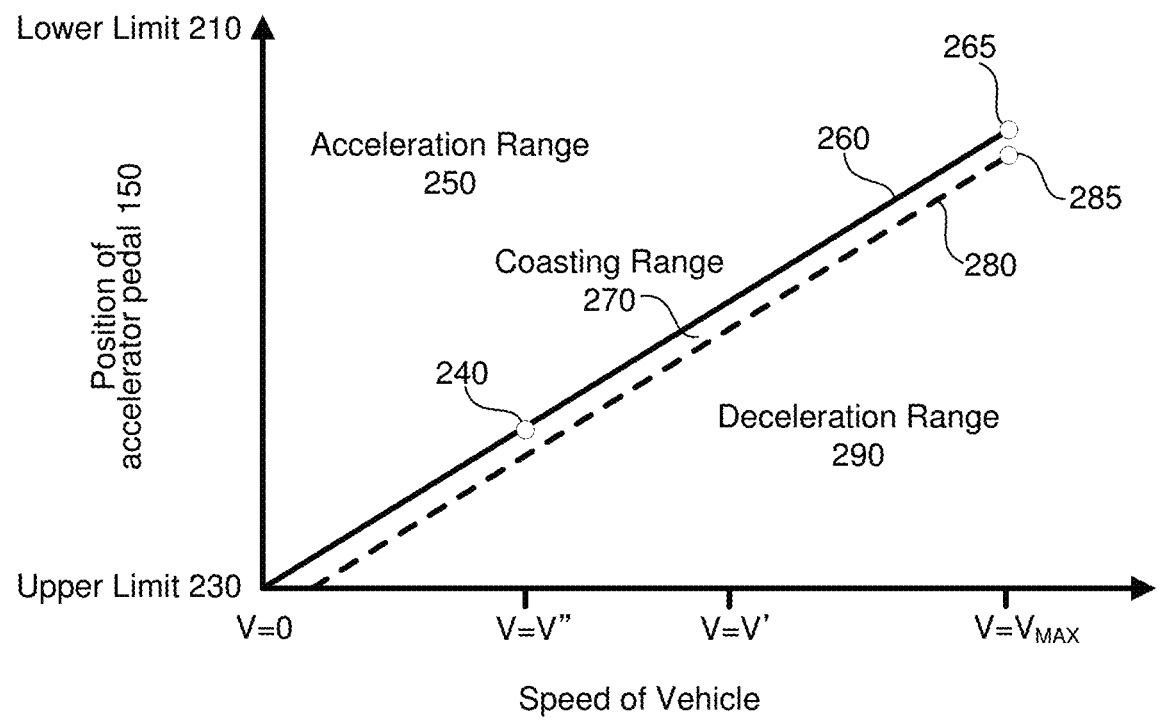
FIGS. 2A-2F depict an exemplary default accelerator pedal map and corresponding states of an accelerator pedal according to example aspects of the subject technology.

FIG. 2A depicts an exemplary default accelerator pedal map 200A according to example aspects of the subject technology. The correlation between default accelerator pedal map 200A in FIG. 2A and the position of accelerator pedal 150 of the vehicle will be described with reference to FIGS. 2B-2F.

Default accelerator pedal map 200A in FIG. 2A is a linear accelerator pedal map where the x-axis represents a speed of the vehicle and the y-axis represents a position of accelerator pedal 150. The speed of the vehicle on the x-axis of default pedal map 200A includes a speed V=0 indicating when the vehicle is at a complete stop (i.e., standstill), a speed $V=V_{MAX}$ indicating when the vehicle is traveling at the maximum speed of the vehicle, and a speed V=V" and a speed V=V' indicate the speeds between the speed V=0 and the speed $V=V_{MAX}$. The position of accelerator pedal 150 on the y-axis of default pedal map 200A includes a lower limit 210 and an upper limit 230. Lower limit 210 represents the lowest point to which accelerator pedal 150 can be depressed. Upper limit 230 represents a point at which accelerator pedal 150 is when accelerator pedal 150 is fully released.

As further shown in FIG. 2A, default accelerator pedal map 200A includes an acceleration range 250, a coasting range 270, and a deceleration range 290. Acceleration range 250 and coasting range 270 are separated by an acceleration/coasting boundary 260 (i.e., solid line). Coasting range 270 and deceleration range 290 are separated by a coasting/deceleration boundary 280 (i.e., dotted line). The area above acceleration/coasting boundary 260 represents acceleration range 250. The area between acceleration/coasting boundary 260 and coasting/deceleration boundary 280 represents coasting area 270. The area below coasting/deceleration boundary 280 represents deceleration area 290.

Default accelerator pedal map 200A may further include a current point 240. Current point 240 represents a point where the current position of accelerator pedal 150 meets the current speed of the vehicle. For instance, default accelerator pedal map 200A depicts current point 240 being disposed at a point where acceleration/coasting boundary 260 meets the speed V=V" indicating that accelerator pedal 150 is currently being depressed for a degree from upper limit 230 and the vehicle is currently traveling at the speed V=V". The position of current point 240 may move according to a change in the position of accelerator pedal 150 and/or a change in the speed of the vehicle.

Default accelerator pedal map 200A may furthermore include an acceleration/coasting boundary endpoint 265 and a coasting/deceleration boundary endpoint 285. Acceleration/coasting boundary endpoint 265 is disposed at the end of acceleration/coasting boundary 260 where acceleration/coasting boundary 260 meets the speed $V=V_{MAX}$. Coasting/deceleration boundary endpoint 285 is disposed at the end of coasting/deceleration boundary 280 where coasting/deceleration boundary 280 meets the speed $V=V_{MAX}$.

Figure 2B:
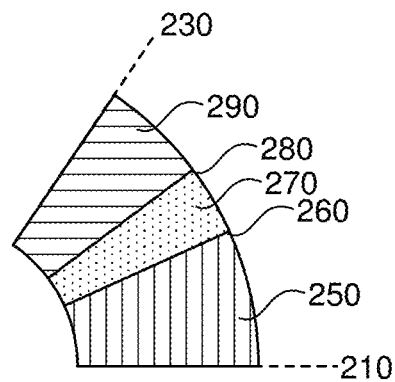

FIG. 2B depicts the ranges (i.e., acceleration range 250, coasting range 270, and deceleration range 290) of default pedal map 200A in FIG. 2A mapped on a stroke of accelerator pedal 150 (not shown in FIG. 2B) while the vehicle travels at non-zero speed (e.g., V=V" or V=V'). As shown in FIG. 2B, lower limit 210 is disposed at the lowest point to which accelerator pedal 150 can be depressed, and upper limit 230 is disposed at a point at which accelerator pedal 150 is when accelerator pedal 150 is fully released. As further shown in FIG. 2B, acceleration range 250 extends from lower limit 210 to acceleration/coasting boundary 260. Coasting range 270 extends from acceleration/coasting boundary 260 to coasting/deceleration boundary 280. Deceleration range 290 extends from coasting/deceleration boundary 280 to upper limit 230.

When the position of accelerator pedal 150 falls within acceleration range 250, controller 110 may control the vehicle to accelerate. When the position of accelerator pedal 150 falls within coasting range 270, controller 110 may control the vehicle to maintain a constant speed. When the position of accelerator pedal 150 falls within deceleration range 290, controller 110 may control the vehicle to decelerate using, for example, regenerative braking.

Figure 2C:
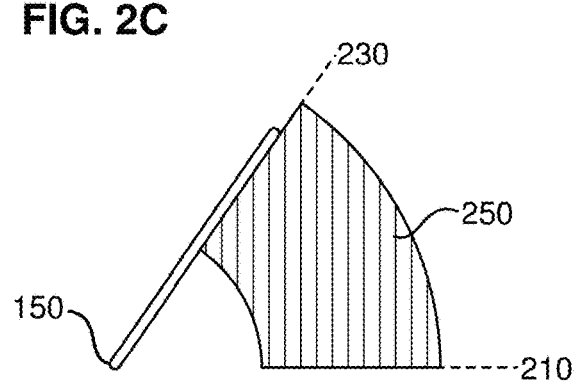

FIG. 2C depicts a state in which accelerator pedal 150 is fully released and the vehicle is at standstill. When accelerator pedal 150 is fully released, the position of accelerator pedal 150 is at upper limit 230. When vehicle is at standstill, the speed of the vehicle is V=0. According to default accelerator pedal map 200A in FIG. 2A, when the position of accelerator pedal 150 is at upper limit 230 and the vehicle is at standstill (i.e., V=0), acceleration range 250 extends from upper limit 230 to lower limit 210. As such, as depicted in FIG. 2C, acceleration range 250 extends from upper limit 230 to lower limit 210 to cover the entirety of the stroke of accelerator pedal 150. This configuration allows the vehicle to accelerate as soon as accelerator pedal 150 is depressed, thereby minimizing the response delay or the free-play of accelerator pedal 150 when the vehicle starts accelerating from standstill.

As shown in default accelerator pedal map 200A in FIG. 2A, the speed of the vehicle linearly increases as a degree of depression of accelerator pedal 150 increases. For example, when accelerator pedal 150 is depressed from a fully released position, the vehicle accelerates according to the slope of acceleration/coasting boundary 260 in default accelerator pedal map 200A. As shown in default accelerator pedal map 200A, as the speed of the vehicle increases, the ratio of the area of acceleration range 250 to the area of deceleration range 290 changes. For example, the area of acceleration range 250 decreases as the area of deceleration range 290 increases as the speed of the vehicle increases. The area of coasting range 270 may increase when the vehicle starts accelerating from V=0 to a predetermined speed (e.g., 5 km/h) or the degree of depression of accelerator pedal 150 increases from upper limit 230 to a predetermined position that match with the predetermined speed. However, after the vehicle reaches the predetermined speed, the area of coasting range 270 may be maintained (unchanged). That is, as the speed of the vehicle increases, a width of each of deceleration range 290, coasting range 270, and acceleration range 250 mapped onto the stroke of accelerator pedal 150 changes to reflect the changes in the areas in corresponding deceleration range 290, coasting range 270, and acceleration range 250 in default accelerator pedal map 200A.

Figure 2D:
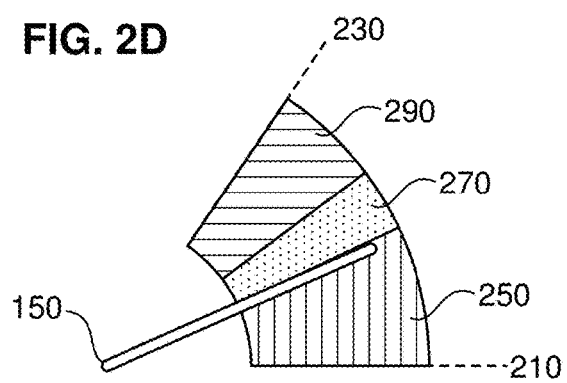

FIG. 2D depicts a state in which accelerator pedal 150 is depressed and the vehicle accelerates to a speed V=V' (first non-zero speed). Specifically, as shown in FIG. 2D, the stroke of accelerator pedal 150 is divided into acceleration range 250, coasting range 270, and deceleration range 290, wherein acceleration range 250 extends from lower limit 210 to coasting range 270, and deceleration range 290 extends from coasting range 270 to upper limit 230. This arrangement of the ranges (i.e., acceleration range 250, coasting range 270, and deceleration range 290) along the stroke of accelerator pedal 150 resembles the arrangement of ranges at V=V' in default accelerator pedal map 200A in FIG. 2A. Since accelerator pedal 150 falls within acceleration range 250, the state depicted in FIG. 2D indicates the vehicle accelerating.

Figure 2E:
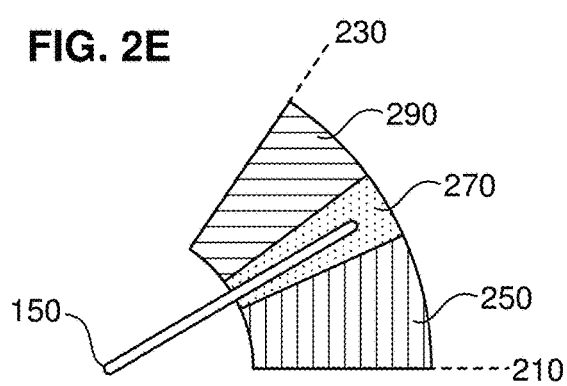

FIG. 2E depicts a state in which accelerator pedal 150 is partially released and the vehicle is traveling at the speed V=V' (first non-zero speed). For example, accelerator pedal 150 may be partially released from the position depicted in FIG. 2D for a degree to place accelerator pedal 150 within coasting range 270 from acceleration range 250 such that the vehicle maintains the current speed (i.e., V=V'). As the current speed is maintained, the arrangement of the ranges on the stroke of accelerator pedal 150 as shown in FIG. 2D is also maintained in FIG. 2E.

Figure 2F:
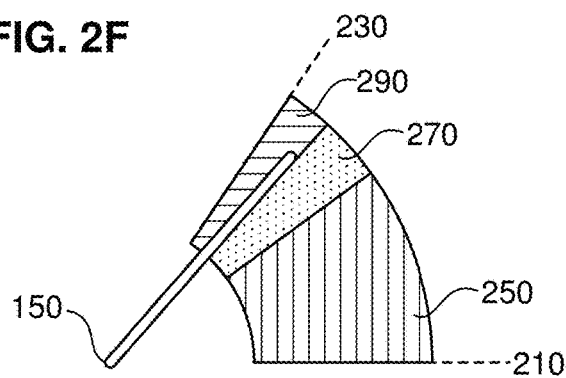

FIG. 2F depicts a state in which accelerator pedal 150 is partially released and the vehicle decelerates to a speed V=V'' (second non-zero speed) from the speed V=V'. For example, accelerator pedal 150 may be partially released from the position depicted in FIG. 2D or in FIG. 2E for a degree to place accelerator pedal 150 within deceleration range 290 from acceleration range 250 such that the vehicle decelerates to the speed V=V'' from the speed V=V' using, for example, the regenerative braking. When the speed of the vehicle decelerates from V=V' to V=V'', the arrangement of the ranges along the stroke of accelerator pedal 150 shown in FIG. 2F resembles the ratio of ranges at V=V'' in default accelerator pedal map 200A, and is different from the arrangement of the ranges depicted in FIG. 2D or FIG. 2E.

Accelerator pedal 150 may be depressed again to reaccelerate the vehicle after accelerator pedal 150 is partially released (i.e., states shown in FIGS. 2E and 2F). In order to reaccelerate, accelerator pedal 150 must move back to acceleration range 250 from the partially released position (i.e., coasting range 270 or deceleration range 290). When accelerator pedal 150 is depressed again to reaccelerate the vehicle from the partially released position, a response delay or free-play (as seen in existing one pedal driving functionality) may be marginal such that the driver may not recognize the response delay or free-play. However, when accelerator pedal 150 is depressed again to reaccelerate the vehicle from a fully released position (i.e., upper limit 230) while the vehicle travels at a non-zero speed, a response delay or free-play (as seen in existing one pedal driving functionality) may be more pronounced than when reaccelerating from the partially released position. The response delay or free-play becomes more pronounced when reaccelerating from the fully released position than when reaccelerating from the partially released position, because the physical distance that accelerator pedal 150 moves from the fully released position (i.e., upper limit 230) to acceleration range 250 is greater than the physical distance that accelerator pedal 150 moves the partially released position (i.e., coasting range 270 or deceleration range 290) to acceleration range 250.

To minimize the issues of a response delay or free-play, when controller 110 detects that accelerator pedal 150 is fully released from the positions of accelerator pedal 150 shown in FIGS. 2D-2F, control 110 transitions from default accelerator pedal map 200A to an adaptive accelerator pedal map.

When controller 110 detects that accelerator pedal 150 is fully released from the position shown in FIGS. 2D-2F while the vehicle travels at a non-zero speed (e.g., V=V'', V=V', etc.), controller 110 switches from default accelerator pedal map 200A to an adaptive accelerator pedal map while controlling the vehicle to decelerate using the regenerative braking force. In some embodiments, controller may switch from default accelerator pedal map 200A to an adaptive accelerator pedal map when controller detects accelerator pedal 150 being fully released and braking pedal 170 being depressed. The adaptive accelerator pedal map will be described below with respect to FIGS. 3A-3D, 4A-4D, and 5A-5D. The adaptive accelerator pedal map includes the similar components as those in default accelerator pedal map 200A, and thus, explanations of those similar components will be omitted.

Figure 3A:
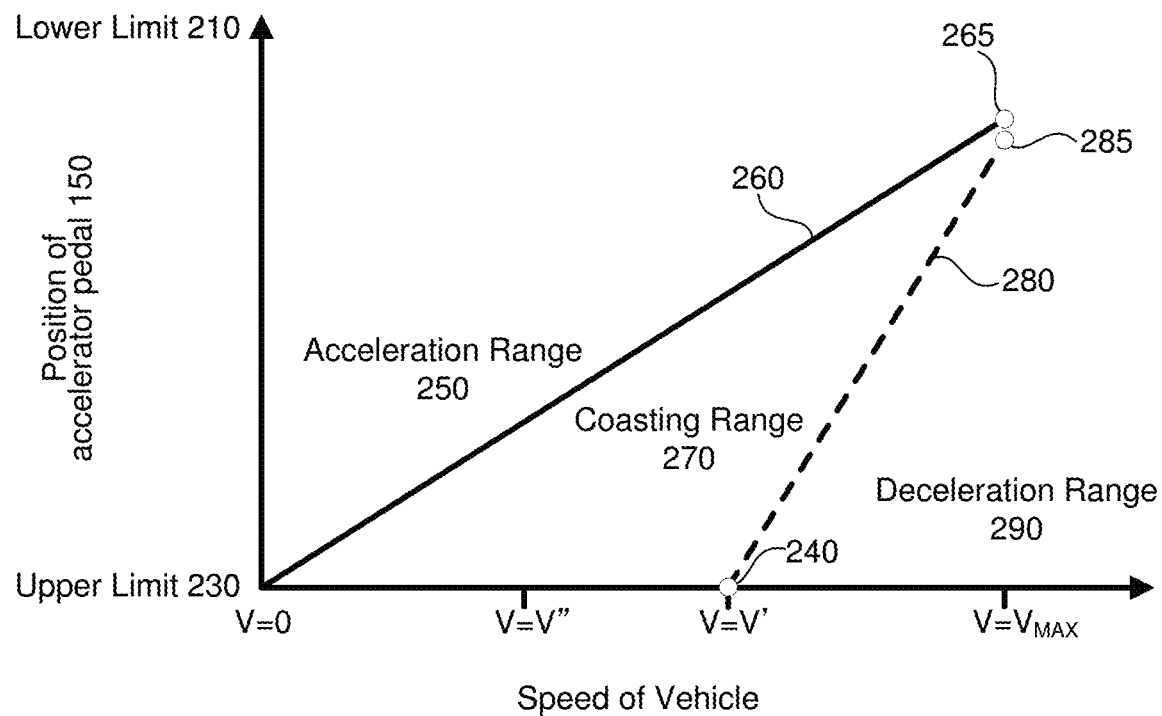
FIGS. 3A-3D illustrate a progress of an exemplary adaptive accelerator pedal map according to example aspects of the subject technology.
Figure 3B:
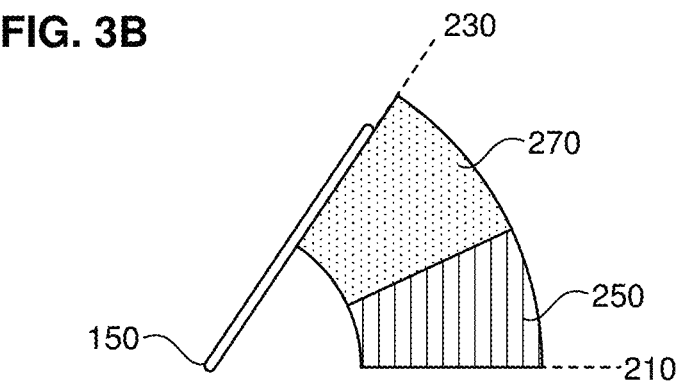

FIGS. 3A-3D illustrate a progress of an exemplary adaptive accelerator pedal map according to example aspects of the subject technology. When controller 110 detects a full release of accelerator pedal 150 from any one of the positions shown in FIGS. 2D-2F, controller 110 transitions from default accelerator pedal map 200A to an adaptive accelerator pedal map 300A shown in FIG. 3A. For example, controller 110 transitions from default accelerator pedal map 200A to adaptive accelerator pedal map 300A at a time when accelerator pedal 150 is fully released while the vehicle travels at the speed V=V'. FIG. 3B depicts the arrangement of ranges shown in adaptive accelerator pedal map 300A along the stroke of accelerator pedal 150 and a state of accelerator pedal 150 at a time when accelerator pedal 150 is fully released while the vehicle travels at the speed V=V'.

Adaptive accelerator pedal map 300A includes some components that are the same as those of default accelerator pedal map 200A. For example, a slope of acceleration/coasting boundary 260 in adaptive accelerator pedal map 300A is the same as that of default accelerator pedal map 200A. Additionally, the positions of acceleration/coasting boundary endpoint 265 and coasting/deceleration boundary endpoint 285 are the same as those of default accelerator pedal map 200A.

Adaptive accelerator pedal map 300A also includes some components that are different from those of default accelerator pedal map 200A. For instance, the position of current point 240 and the slope of coasting/deceleration boundary 280 in adaptive accelerator pedal map 300A are different from those of default accelerator pedal map 200A. Since adaptive accelerator pedal map 300A depicts the moment at which accelerator pedal 150 is fully released while the vehicle travels at the speed V=V', current point 240 is disposed at a point where the current position of accelerator pedal 150 (i.e., at upper limit 230) meets the current speed V=V'. Further, in adaptive accelerator pedal map 300A, coasting/deceleration boundary 280 extends from current point 240 to coasting/deceleration boundary endpoint 285 facilitating a change in the slope of coasting/deceleration boundary 280.

In other words, although the slope of acceleration/coasting boundary 260 in adaptive accelerator pedal map 300A is maintained from default accelerator pedal map 200A, the slope of coasting/deceleration boundary 280 in adaptive accelerator pedal map 300A is updated according to the change in the position of current point 240. For instance, while accelerator pedal 150 is maintained to at the fully released position, the vehicle continues to decelerate using regenerative braking, for example, from the speed V=V' to the speed V=V". The change in the speed facilitates the current position of current point 240 to move from the point where the position of accelerator pedal 150 (i.e., at upper limit 230) meets the current speed V=V' to a point where the position of accelerator pedal 150 (i.e., at upper limit 230) meets the speed V=V". The change in the position of current point 240 causes the slope of coasting/deceleration boundary 280 in adaptive accelerator pedal map 300A. The change in the slope of coasting/deceleration boundary 280 causes controller 110 to update adaptive accelerator pedal map 300A shown in FIG. 3A to an adaptive accelerator pedal map 300C shown in FIG. 3C.

Adaptive accelerator pedal map 300C depicts the moment where the accelerator pedal 150 is maintained at the fully released position for a period of time after accelerator pedal 150 is fully released at speed V=V' and where the vehicle decelerates from the speed V=V' to the speed V=V". The components in adaptive accelerator pedal map 300C are the same as those in adaptive accelerator pedal map 300A except for the position of current point 240 and the slope of coasting/deceleration boundary 280.

Figure 3C:
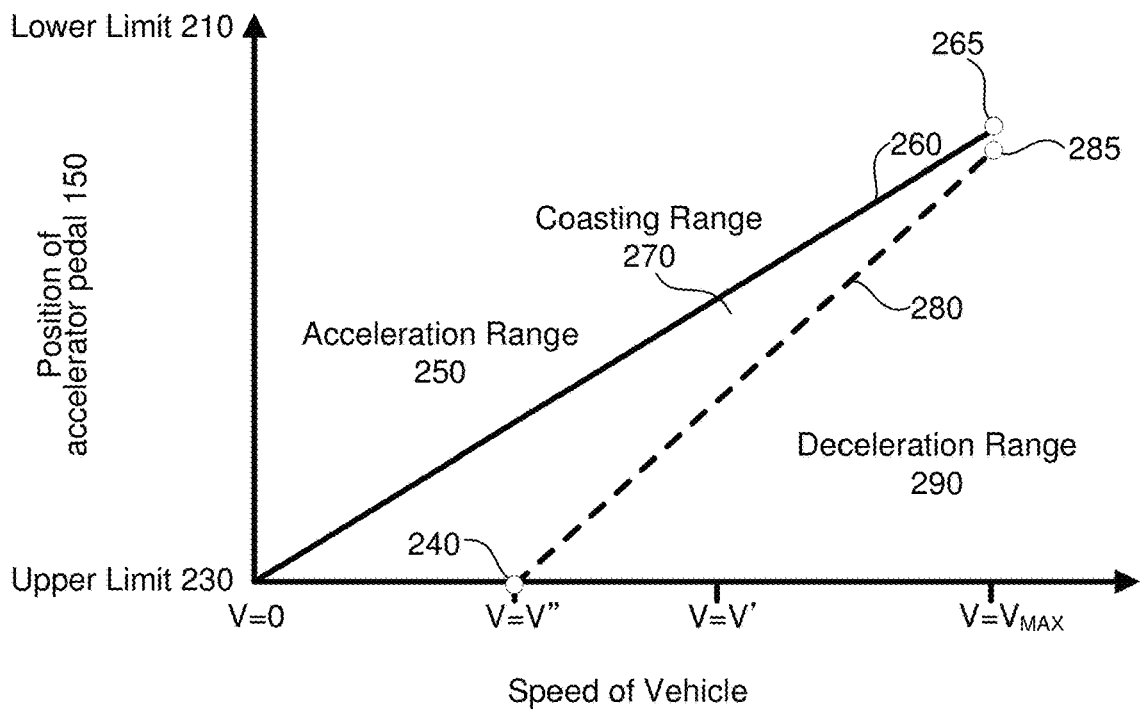
Figure 3D:
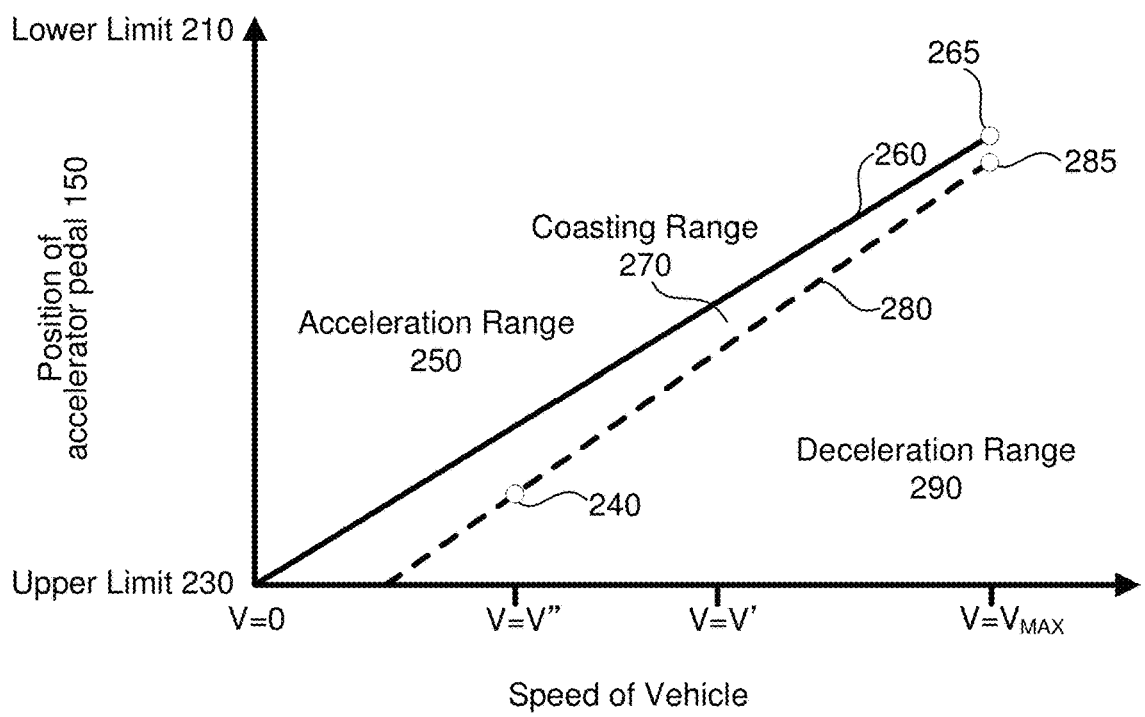

When accelerator pedal 150 is depressed again at the speed V=V" to reaccelerate the vehicle, the position of the current point 240 moves away from upper limit 230 toward lower limit 210 as shown in an adaptive accelerator pedal map 300D in FIG. 3D. That is, in response to accelerator pedal 150 being depressed at the speed V=V" for reacceleration, controller 110 further updates adaptive accelerator pedal map 300C to adaptive accelerator pedal map 300D.

When accelerator pedal 150 is depressed to a certain degree from the fully released position depicted in FIG. 3C to reaccelerate the vehicle, the position of accelerator pedal 150 moves away from upper limit 230 towards lower limit 210, but may still continue to fall within coasting range 270 allowing the vehicle to maintain the speed V=V" as shown in adaptive accelerator pedal map 300D. The speed of the vehicle is maintained at the speed V=V" until accelerator pedal 150 is further depressed and reaches acceleration range 250.

As shown in adaptive accelerator pedal map 300D, when the position of accelerator pedal 150 moves away from upper limit 230 for reacceleration, the position of current point 240 also moves away from upper limit 230 facilitating coasting/deceleration boundary 280 to be updated to extend straight from coasting/deceleration boundary endpoint 285 to upper limit 230 through current point 240.

As shown in adaptive accelerator pedal map 300D, when accelerator pedal 150 is depressed again to reaccelerate the vehicle, accelerator pedal 150 temporarily falls within coasting range 270 before reaching acceleration range 250 causing the vehicle to maintain the speed at which accelerator pedal 150 was depressed again to reaccelerate the vehicle. This configuration minimizes the discrepancy that occurs during reacceleration in the existing one pedal driving functionality wherein the vehicle decelerates even when the accelerator pedal is being depressed. Additionally, adaptive accelerator pedal map 300D allows the vehicle to decelerate again if accelerator pedal 150 is fully or partially released after the vehicle reaccelerates.

When the slope of coasting/deceleration boundary 280 in adaptive accelerator pedal map 300D matches the slope of coasting/deceleration boundary 280 in default accelerator pedal map 200A, controller 110 switches from adaptive accelerator pedal map 300D to default accelerator pedal map 200A. In some embodiments, controller 110 switches from adaptive accelerator pedal map 300D to default accelerator pedal map 200A when the position of current point 240 moves to the origin of adaptive accelerator pedal map 300D (i.e., when the vehicle comes to a stop). Yet, in some other embodiments, controller 110 switches from adaptive accelerator pedal map 300D to default accelerator pedal map 200A when the vehicle keeps accelerating despite the fact that accelerator pedal 150 is fully or partially released. Such situations may include when the driver of the vehicle fully or partially releases accelerator pedal 150 while driving a steep downhill and when the downhill force is greater than the counteracting force (i.e., braking force of the vehicle, the vehicle may accelerate despite the fact that accelerator pedal 150 is fully or partially released for deceleration. These configurations allow for seamless transition back to default accelerator pedal map from adaptive accelerator pedal map 300D.

Figure 4A:
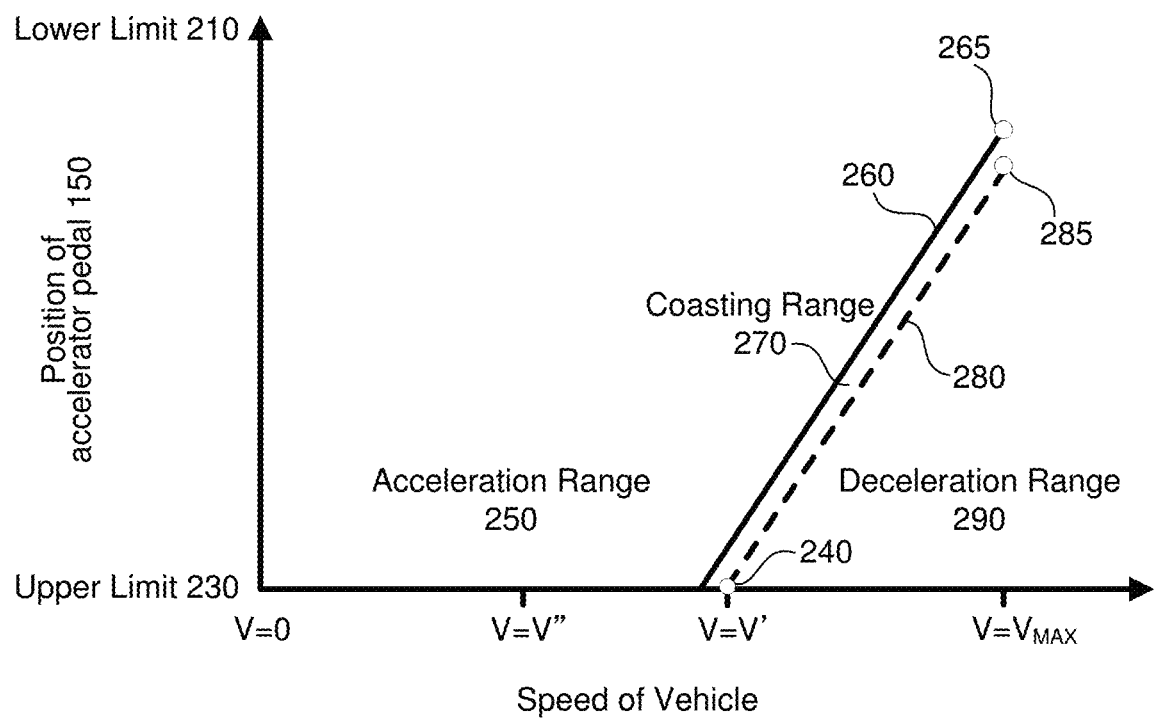
FIGS. 4A-4D illustrate a progress of an exemplary adaptive accelerator pedal map according to example aspects of the subject technology.
Figure 4B:
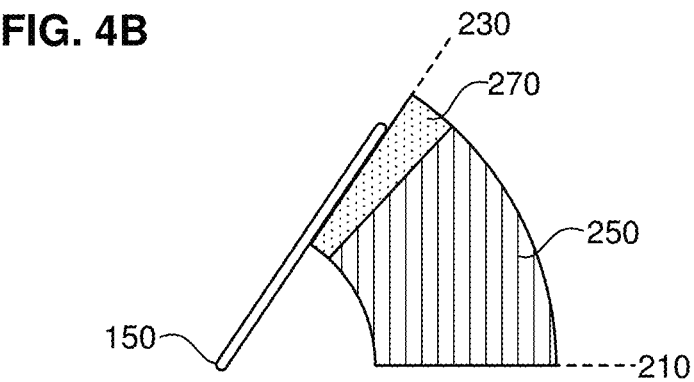

FIGS. 4A-4D illustrate a progress of an exemplary adaptive accelerator pedal map according to example aspects of the subject technology. When controller 110 detects a full release of accelerator pedal 150 from any one of the positions shown in FIGS. 2D-2F, controller 110 transitions from default accelerator pedal map 200A to an adaptive accelerator pedal map 400A shown in FIG. 4A. For example, controller 110 transitions from default accelerator pedal map 200A to adaptive accelerator pedal map 400A at a time when accelerator pedal 150 is fully released while the vehicle travels at the speed V=V'. FIG. 4B depicts the arrangement of ranges shown in adaptive accelerator pedal map 400A along the stroke of accelerator pedal 150 and a state of accelerator pedal 150 at a time when accelerator pedal 150 is fully released while the vehicle travels at the speed V=V'.

Adaptive accelerator pedal map 400A includes some components that are the same as those of default accelerator pedal map 200A. For example, the positions of acceleration/coasting boundary endpoint 265 and coasting/deceleration boundary endpoint 285 are the same as those of default accelerator pedal map 200A. Adaptive accelerator pedal map 400A also includes some components that are different from those of default accelerator pedal map 200A. For instance, the position of current point 240, the slope of acceleration/coasting boundary 260, and the slope of coasting/deceleration boundary 280 in adaptive accelerator pedal map 400A are different from those of default accelerator pedal map 200A.

Since adaptive accelerator pedal map 400A depicts the moment at which accelerator pedal 150 is fully released while the vehicle travels at the speed V=V', current point 240 is disposed at a point where the position of accelerator pedal 150 (i.e., at upper limit 230) meets the speed V=V'. Further, in adaptive accelerator pedal map 400A, coasting/deceleration boundary 280 extends from current point 240 to coasting/deceleration boundary endpoint 285 facilitating a change in the slope of coasting/deceleration boundary 280. Furthermore, in adaptive accelerator pedal map 400A, the slope of acceleration/coasting boundary 260 may be set to be the same as the slope of coasting/deceleration boundary 280. That is, in adaptive accelerator pedal map 400A, acceleration/coasting boundary 260 parallels coasting/deceleration boundary 280. In other words, the distance between acceleration/coasting boundary 260 and coasting/deceleration boundary 280 in default accelerator pedal map 200A may be maintained in adaptive accelerated pedal map 400A.

In other words, the slopes of acceleration/coasting boundary 260 and coasting/deceleration boundary 280 in adaptive accelerator pedal map 400A are both updated according to the changes in the position of current point 240. For instance, while accelerator pedal 150 is maintained to at the fully released position, the vehicle continues to decelerate using regenerative braking, for example, from the speed V=V' to the speed V=V'''. The change in the speed facilitates the position of current point 240 to move from the point where the position of accelerator pedal 150 (i.e., at upper limit 230) meets the current speed V=V' to a point where the position of accelerator pedal 150 (i.e., at upper limit 230) meets the speed V=V'''. The change in the position of current point 240 adaptive accelerator pedal map 400A causes the slopes of acceleration/coasting boundary 260 and coasting/deceleration boundary 280 to also change facilitating controller 110 to update adaptive accelerator pedal map 400A to an adaptive accelerator pedal map 400C shown in FIG. 4C.

Adaptive accelerator pedal map 400C depicts the moment where the accelerator pedal 150 is maintained at the fully released position for a period of time after accelerator pedal 150 is fully released at speed V=V' and the vehicle decelerates from the speed V=V' to the speed V=V'''. The components in adaptive accelerator pedal map 400C are the same as those in adaptive accelerator pedal map 400A except for the position of current point 240 and the slopes of acceleration/coasting boundary 260 and coasting/deceleration boundary 280.

Figure 4C:
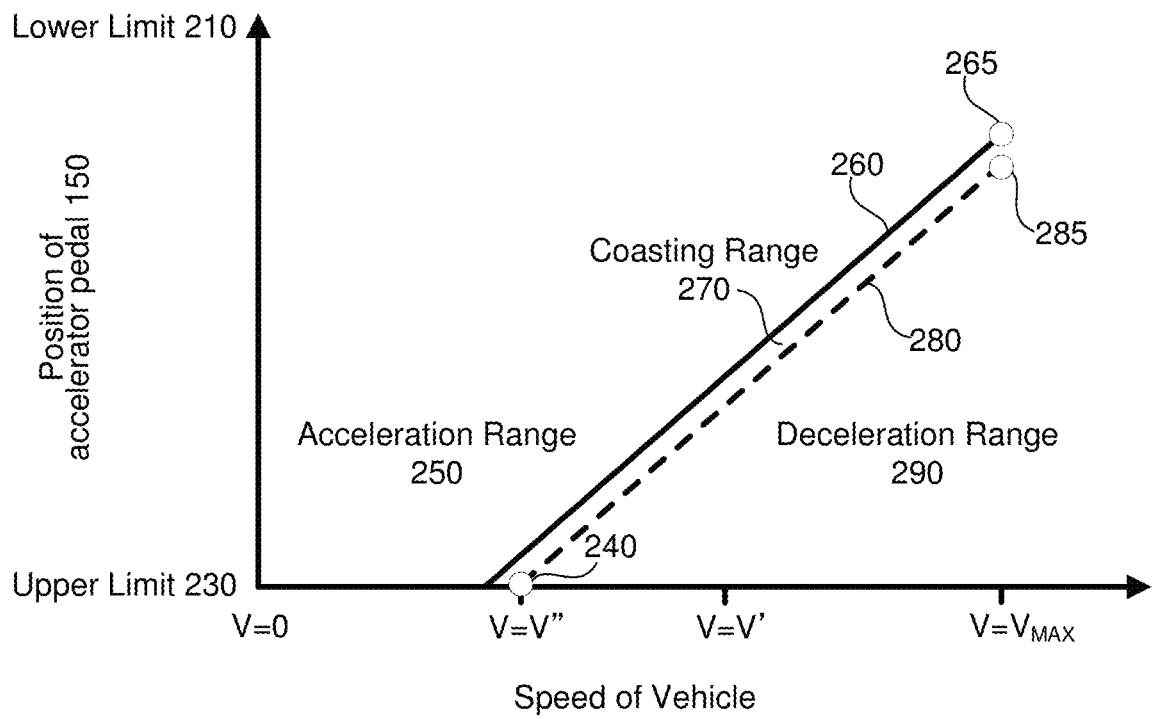
Figure 4D:
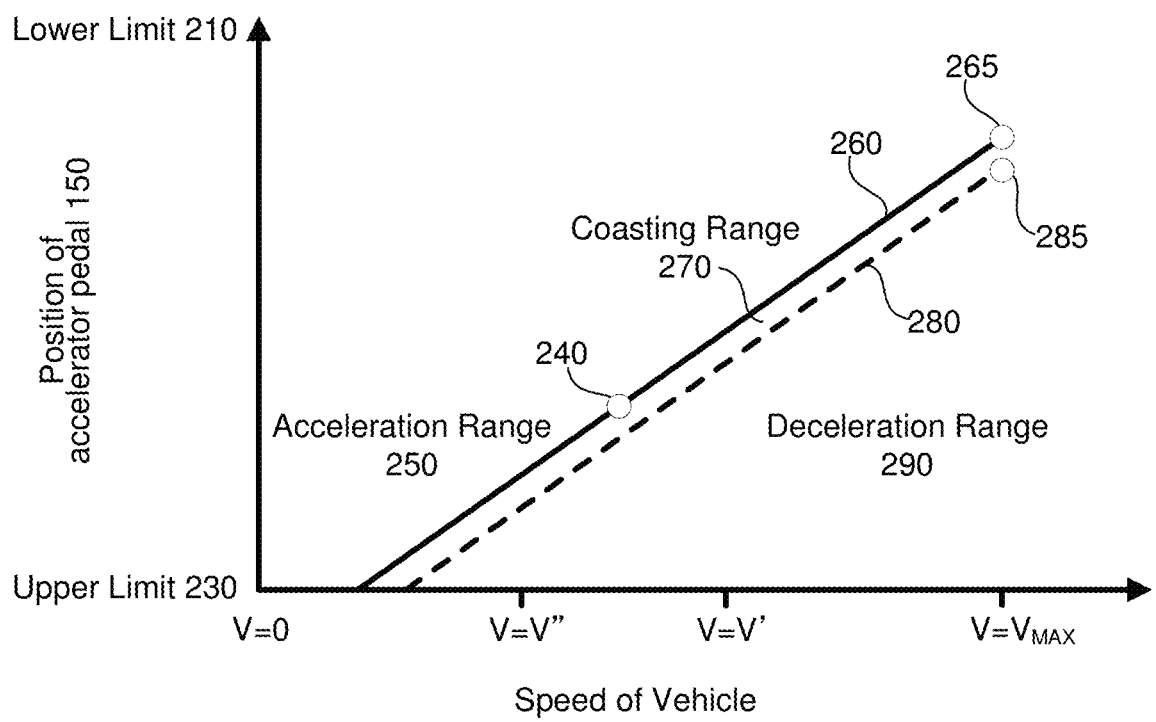

When accelerator pedal 150 is depressed again at the speed V=V''' to reaccelerate the vehicle, the position of the current point 240 moves away from upper limit 230 towards lower limit 210 as shown an adaptive accelerator pedal map 400D in FIG. 4D. When the position of the current point 240 starts moving away from upper limit 230, controller 110 transitions from adaptive accelerator pedal map 400C to adaptive accelerator pedal map 400D in FIG. 4D.

When accelerator pedal 150 is depressed to a certain degree from the fully released position depicted in FIG. 4C to reaccelerate the vehicle, the position of accelerator pedal 150 moves away from upper limit 230 towards lower limit 210 and may continue to fall within coasting range 270 allowing the vehicle to maintain the speed V=V'''. When accelerator pedal 150 is further depressed and reaches acceleration range 250 as shown in adaptive accelerator pedal map 400D, the vehicle reaccelerates.

As shown in adaptive accelerator pedal map 400D, when the position of current point 240 moves away from upper limit 230 for reacceleration, acceleration/coasting boundary 260 is updated to extend straight from acceleration/coasting boundary endpoint 265 to upper limit 230 through current point 240. Since acceleration/coasting boundary 260 and coasting/deceleration boundary 280 are set to parallel each other in this embodiment, coasting/deceleration boundary 280 is updated as acceleration/coasting boundary 260 is updated according to the change in the position of current point 240.

As shown in adaptive accelerator pedal map 400D, when accelerator pedal 150 is depressed again to reaccelerate the vehicle, accelerator pedal 150 temporarily falls within coasting range 270 before reaching acceleration range 250. However, since the area of coasting range 270 in adaptive accelerator pedal map 400D is smaller than that of adaptive accelerator pedal map 300D, the degree of depression of accelerator pedal 150 to reach acceleration range 250 in adaptive accelerator pedal map 400D is smaller than that in adaptive accelerator pedal map 300D. This configuration not only minimizes the discrepancy that occurs during reacceleration in the existing one pedal driving functionality wherein the vehicle decelerates even when the accelerator pedal is being depressed, but also minimizes the non-acceleration state (i.e., speed maintained) that the vehicle experiences until the accelerator pedal reaches the acceleration range. Additionally, adaptive accelerator pedal map 400D allows the vehicle to decelerate again if accelerator pedal 150 is fully or partially released after the vehicle reaccelerates.

When the slope of acceleration/coasting boundary 260 in adaptive accelerator pedal map 400D matches the slope of acceleration/coasting boundary 260 in default accelerator pedal map 200A, controller 110 switches from adaptive accelerator pedal map 400D to default accelerator pedal map 200A. In some embodiments, controller 110 switches from adaptive accelerator pedal map 400D to default accelerator pedal map 200A when the position of current point 240 moves to the origin of adaptive accelerator pedal map 400D (i.e., when the vehicle comes to a stop). Yet, in some other embodiments, controller 110 switches from adaptive accelerator pedal map 400D to default accelerator pedal map 200A when the vehicle keeps accelerating despite the fact that accelerator pedal 150 is fully or partially released. Such situations may include when the driver of the vehicle fully or partially releases accelerator pedal 150 while driving a steep downhill and when the downhill force is greater than the counteracting force (i.e., braking force of the vehicle, the vehicle may accelerate despite the fact that accelerator pedal 150 is fully or partially released for deceleration. These configurations allow for seamless transition back to default accelerator pedal map from adaptive accelerator pedal map 400D.

Figure 5A:
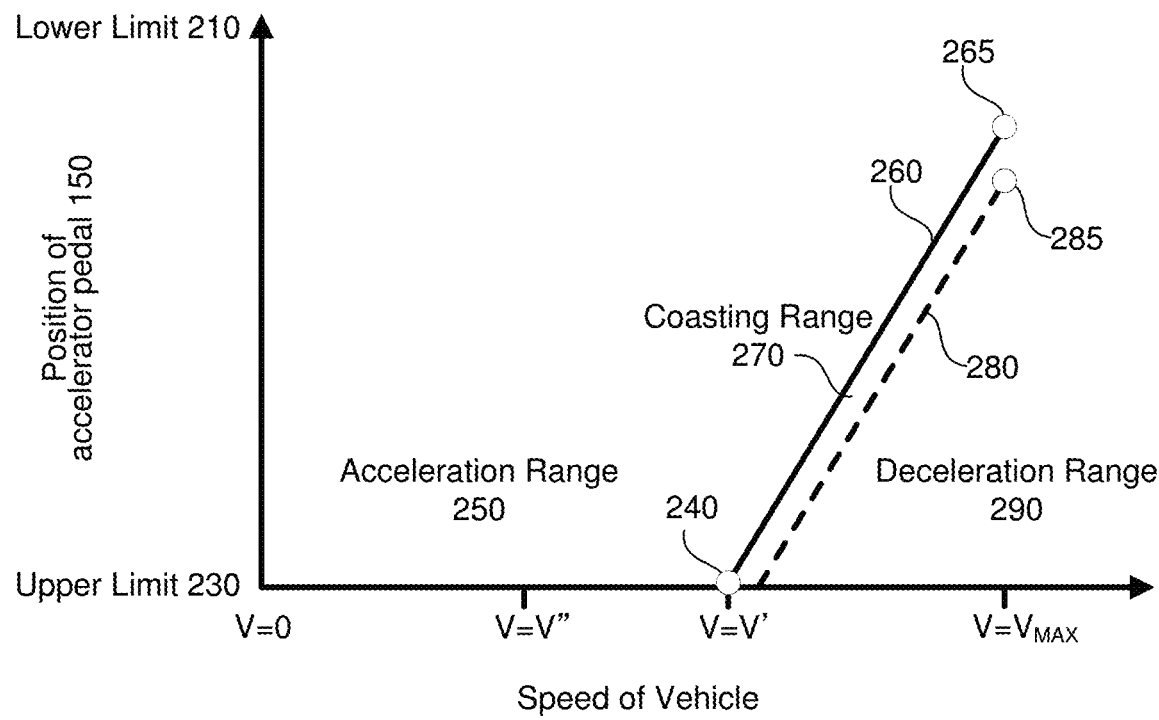
FIGS. 5A-5D illustrate a progress of an exemplary adaptive accelerator pedal map according to example aspects of the subject technology.
Figure 5B:
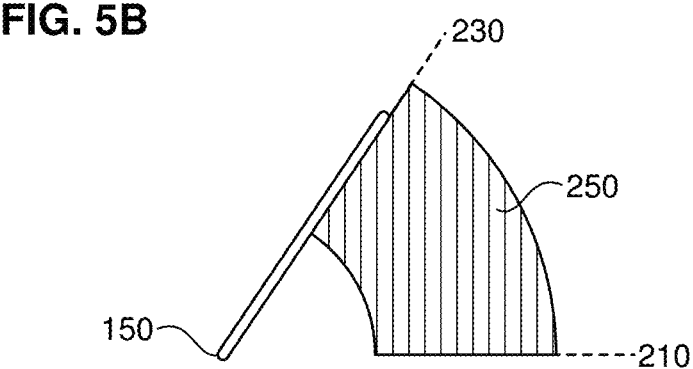

FIGS. 5A-5D illustrate a progress of an exemplary adaptive accelerator pedal map according to example aspects of the subject technology. When controller 110 detects a full release of accelerator pedal 150 from any one of the positions shown in FIGS. 2D-2F, controller 110 transitions from default accelerator pedal map 200A to an adaptive accelerator pedal map 500A shown in FIG. 5A. For example, controller 110 transitions from default accelerator pedal map 200A to adaptive accelerator pedal map 500A at a time when accelerator pedal 150 is fully released while the vehicle travels at the speed V=V'. FIG. 5B depicts the arrangement of ranges shown in adaptive accelerator pedal map 500A along the stroke of accelerator pedal 150 and a state of accelerator pedal 150 at a time when accelerator pedal 150 is fully released while the vehicle travels at the speed V=V'.

Adaptive accelerator pedal map 500A includes some components that are the same as those of default accelerator pedal map 200A. For example, the positions of acceleration/coasting boundary endpoint 265 and coasting/deceleration boundary endpoint 285 are the same as those of default accelerator pedal map 200A. Adaptive accelerator pedal map 500A also includes some components that are different from those of default accelerator pedal map 200A. For instance, the position of current point 240, the slope of acceleration/coasting boundary 260, and the slope of coasting/deceleration boundary 280 in adaptive accelerator pedal map 500A are different from those of default accelerator pedal map 200A.

Since adaptive accelerator pedal map 500A depicts the moment at which accelerator pedal 150 is fully released while the vehicle travels at the speed V=V', current point 240 is disposed at a point where the position of accelerator pedal 150 (i.e., at upper limit 230) meets the speed V=V'.

Further, in adaptive accelerator pedal map 500A, acceleration/coasting boundary 260 extends from current point 240 to acceleration/coasting boundary endpoint 265 facilitating a change in the slope of acceleration/coasting boundary 260. Furthermore, in adaptive accelerator pedal map 500A, the slope of coasting/deceleration boundary 280 may be set to be the same as the slope of acceleration/coasting boundary 260. That is, in adaptive accelerator pedal map 500A, acceleration/coasting boundary 260 parallels coasting/deceleration boundary 280. For example, the distance between acceleration/coasting boundary 260 and coasting/deceleration boundary 280 in default accelerator pedal map 200A may be maintained in adaptive accelerated pedal map 500A.

In other words, the slopes of acceleration/coasting boundary 260 and coasting/deceleration boundary 280 in adaptive accelerator pedal map 500A are both updated according to the changes in the position of current point 240. For instance, while accelerator pedal 150 is maintained to at the fully released position, the vehicle continues to decelerate using regenerative braking, for example, from the speed V=V' to the speed V=V". The change in the speed facilitates the current position of current point 240 to move from the point where the position of accelerator pedal 150 (i.e., at upper limit 230) meets the current speed V=V' to a point where the position of accelerator pedal 150 (i.e., at upper limit 230) meets the speed V=V". The change in the position of current point 240 adaptive accelerator pedal map 400A causes the slopes of acceleration/coasting boundary 260 and coasting/deceleration boundary 280 to also change facilitating controller 110 to update adaptive accelerator pedal map 500A to an adaptive accelerator pedal map 500C shown in FIG. 5C.

Adaptive accelerator pedal map 500C depicts the moment where the accelerator pedal 150 is maintained at the fully released position for a period of time after accelerator pedal 150 is fully released at speed V=V' and the vehicle decelerates from the speed V=V' to the speed V=V". The components in adaptive accelerator pedal map 500C are the same as those in adaptive accelerator pedal map 500A except for the position of current point 240 and the slopes of acceleration/coasting boundary 260 and coasting/deceleration boundary 280.

Figure 5C:
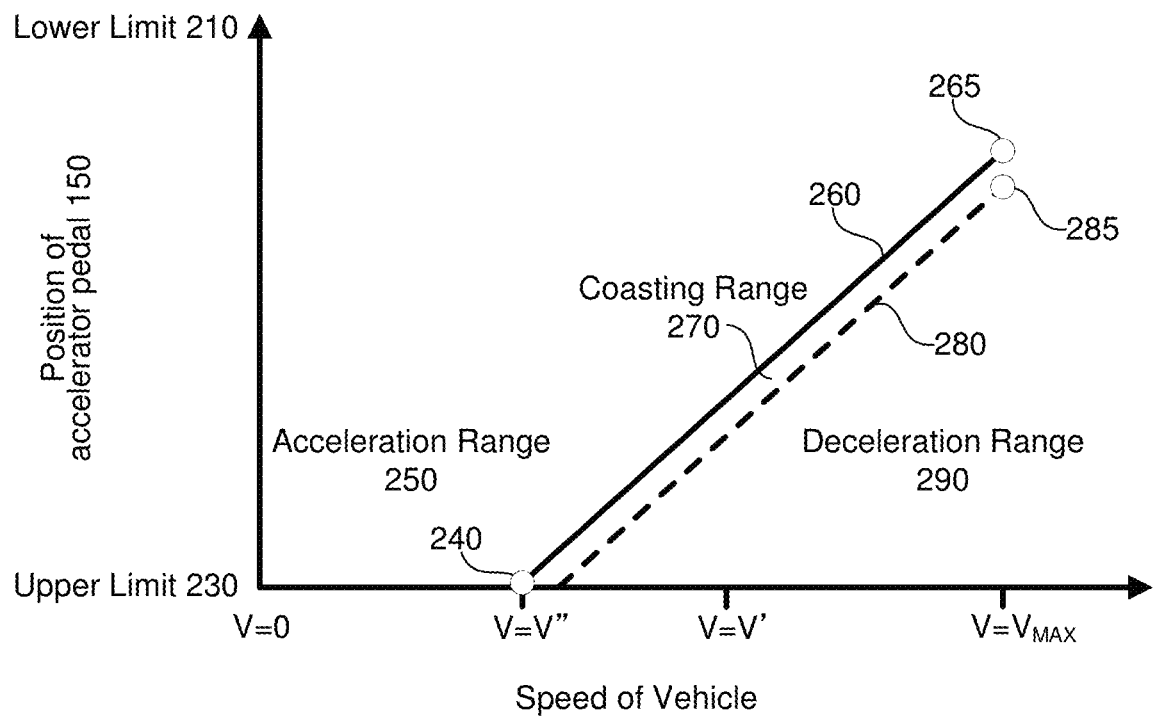
Figure 5D:
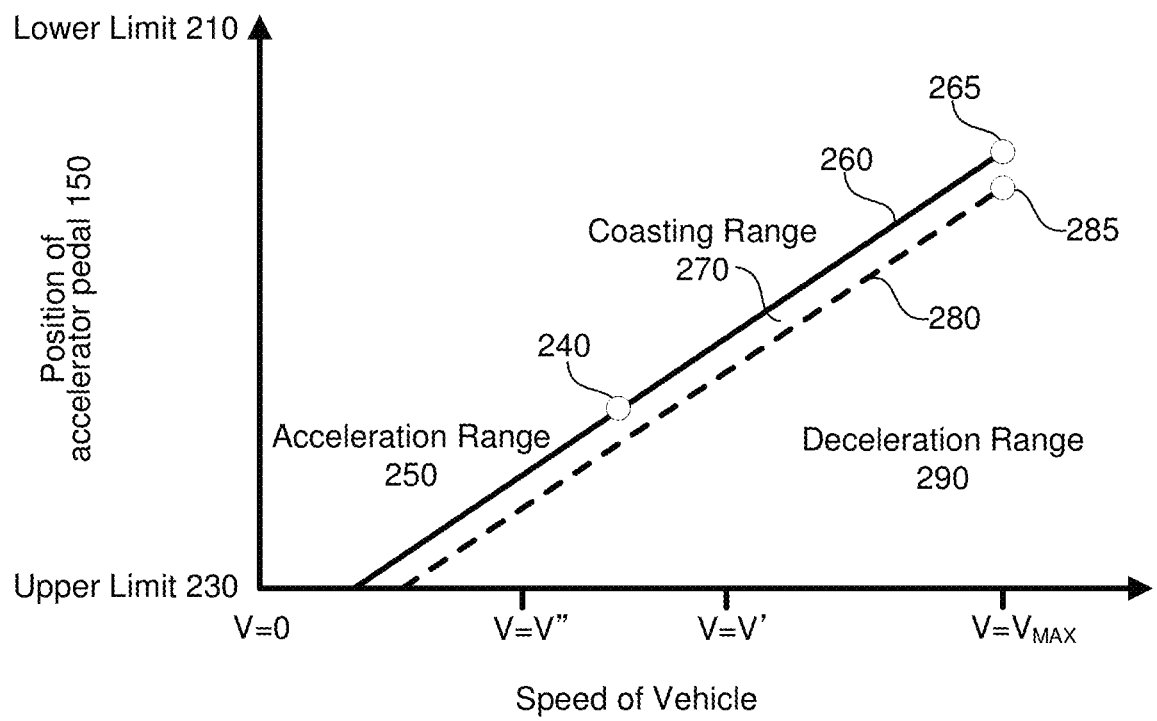

When accelerator pedal 150 is depressed again at the speed V=V" to reaccelerate the vehicle, the position of the current point 240 moves away from upper limit 230 towards lower limit 210 as shown in an adaptive accelerator pedal map 500D in FIG. 5D. When the position of the current point 240 starts moving away from upper limit 230, controller 110 transitions from adaptive accelerator pedal map 500C to adaptive accelerator pedal map 500D in FIG. 5D.

When accelerator pedal 150 is depressed from the fully released position depicted in FIG. 5C to reaccelerate the vehicle, the position of accelerator pedal 150 moves away from upper limit 230 towards lower limit 210 and falls within acceleration range 250 without accelerator pedal 150 traveling through coasting range 270 allowing the vehicle to reaccelerate immediately after the depression of accelerator pedal 150.

As shown in adaptive accelerator pedal map 500D, when the position of current point 240 moves away from upper limit 230 for reacceleration, acceleration/coasting boundary 260 is updated to extend straight from acceleration/coasting boundary endpoint 265 to upper limit 230 through current point 240. Since acceleration/coasting boundary 260 and coasting/deceleration boundary 280 are set to parallel each other in this embodiment, coasting/deceleration boundary 280 is updated as acceleration/coasting boundary 260 is updated according to the change in the position of current point 240.

As shown in adaptive accelerator pedal map 500D, when accelerator pedal 150 is depressed again to reaccelerate the vehicle, accelerator pedal 150 immediately falls within acceleration range 250. This configuration not only minimizes the discrepancy that occurs during reacceleration in the existing one pedal driving functionality wherein the vehicle decelerates or maintains a constant speed even when the accelerator pedal is being depressed, but also provides instant reacceleration that matches the expectation of the driver when depressing accelerator pedal 150. Additionally, adaptive accelerator pedal map 500D allows the vehicle to decelerate again if accelerator pedal 150 is fully or partially released after the vehicle reaccelerates.

When the slope of acceleration/coasting boundary 260 in adaptive accelerator pedal map 500D matches the slope of acceleration/coasting boundary 260 in default accelerator pedal map 200A, controller 110 switches from adaptive accelerator pedal map 500D to default accelerator pedal map 200A. In some embodiments, controller 110 switches from adaptive accelerator pedal map 500D to default accelerator pedal map 200A when the position of current point 240 moves to the origin of adaptive accelerator pedal map 500D (i.e., when the vehicle comes to a stop). Yet, in some other embodiments, controller 110 switches from adaptive accelerator pedal map 500D to default accelerator pedal map 200A when the vehicle keeps accelerating despite the fact that accelerator pedal 150 is fully or partially released. Such situations may include when the driver of the vehicle fully or partially releases accelerator pedal 150 while driving a steep downhill and when the downhill force is greater than the counteracting force (i.e., braking force of the vehicle, the vehicle may accelerate despite the fact that accelerator pedal 150 is fully or partially released for deceleration. These configurations allow for seamless transition back to default accelerator pedal map from adaptive accelerator pedal map 500D.

FIG. 6 depicts a flow diagram 600 of an example process for switching from default accelerator pedal map to adaptive accelerator pedal map according to example aspects of the subject technology. For explanatory purposes, the example process of FIG. 6 is described herein with reference to the components of FIGS. 1, 2A-2F, 3A-3D, 4A-4D, and 5A-5D. Further for explanatory purposes, the blocks of the example process of FIG. 6 are described herein as occurring in serial, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram 600, at block 601, controller 110 detects a full release of accelerator pedal 150 while the vehicle travels at a first non-zero speed (i.e., V=V') according to default accelerator pedal map 200A. For example, when the driver of the vehicle depresses accelerator pedal 150 while the vehicle is at standstill (V=0), controller 110 refers to default accelerator pedal map 200A and controls the vehicle to accelerate according to default accelerator pedal map 200A. While the vehicle is traveling at the first non-zero speed (e.g., V=V'), the driver may see, for example, a preceding vehicle slows down, and fully release accelerator pedal 150 to decelerate the vehicle to accommodate the slowing down of the preceding vehicle. Controller 110 may detect that accelerator pedal 150 is fully released based on a position of accelerator pedal 150 communicated from accelerator pedal position sensor 160. In some embodiments, controller 110 may determine that accelerator pedal 150 is fully released when controller 110 detects that brake pedal 170 is depressed.

At block 603, in response to detecting the full release of accelerator pedal 150, controller 110 may control the vehicle to decelerate, for example, using the regenerative braking force. In some embodiments, controller 110 may control the vehicle to decelerate using the friction braking force when the driver of the vehicle depresses brake pedal 170 in addition to fully releasing accelerator pedal 150.

At block 605, in response to detecting the full release of accelerator pedal 150, controller 110 may switch from default accelerator pedal map 200A to an adaptive accelerator pedal map (e.g., adaptive accelerator pedal maps 300A, 400A, or 500A). Controller 110 may switch to the adaptive accelerator pedal map in response to detecting a full release of accelerator pedal 150 while the vehicle travels at the first non-zero speed. In some embodiments, controller 110 may switch to the adaptive accelerator pedal map in response to detecting a full release of accelerator pedal 150 and a depression of brake pedal 170 while the vehicle travels at the first non-zero speed.

At block 607, while the vehicle decelerates, controller 110 may adjust the adaptive accelerator pedal map (e.g., adaptive accelerator pedal map 300A, 400A, or 500A) according to a change (i.e., reduction) in the speed of the vehicle. For example, after controller 110 switches from default accelerator pedal map 200A to adaptive accelerator pedal map 300A and while the vehicle decelerating, controller 110 adjusts the slope of the coasting/deceleration boundary 280 according to the change in the position of current point 240, which represents the current position of accelerator pedal 150 and the current speed, as shown in adaptive accelerator pedal map 300C. Since the vehicle is decelerating, the position of current point 240 changes as the speed of the vehicle decreases.

In some embodiments, controller 110 may switch from default accelerator pedal map 200A to adaptive accelerator pedal map 400A or adaptive accelerator pedal map 500A. In such a case, controller 110 adjusts both the slope of acceleration/coasting boundary 260 and the slope of coasting/deceleration boundary 280 according to the change in the position of current point 240 as shown in adaptive accelerator pedal map 400C or adaptive accelerator pedal map 500C.

At block 609, when a depression of the accelerator pedal 150 to reaccelerate the vehicle is detected at a second non-zero speed (i.e., V=V") while the vehicle decelerates from the first non-zero speed (i.e., V=V') and before the speed of the vehicle reaches zero (i.e., V=0), controller 110 controls the vehicle to maintain a current speed of the vehicle or reaccelerate the vehicle according to the adjusted adaptive accelerator pedal map without further decelerating the vehicle. For example, when accelerator pedal 150 is depressed at the second non-zero speed (i.e., V=V") while the vehicle decelerates according to adaptive accelerator pedal map 300A, controller 110 controls the vehicle to maintain the current speed (i.e., V=V") according to adaptive accelerator pedal map 300C.

In some embodiments, when accelerator pedal 150 is depressed at the second non-zero speed (i.e., V=V") while the vehicle decelerates according to adaptive accelerator pedal map 400A, controller 110 controls the vehicle to maintain the current speed (i.e., V=V") according to adaptive accelerator pedal map 400C. In some other embodiments, when accelerator pedal 150 is depressed at the second non-zero speed (i.e., V=V") while the vehicle decelerates according to adaptive accelerator pedal map 500A, controller 110 controls the vehicle to accelerate according to adaptive accelerator pedal map 500C.

This configuration minimizes the discrepancy that occurs in the existing one pedal driving functionality when the accelerator pedal is being depressed to reaccelerate but the vehicle decelerates until the accelerator pedal reaches the acceleration range, and also reduces the response delay or free-play that occurs in the existing one pedal driving functionality when the accelerator pedal is being depressed to reaccelerate.

Figure 7A:
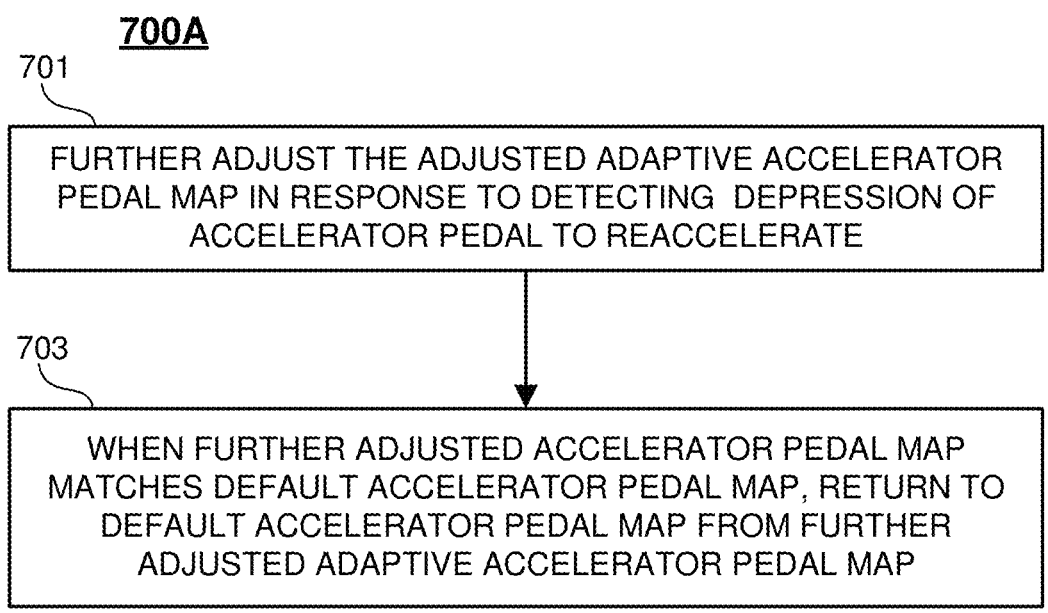
FIGS. 7A and 7B illustrate exemplary processes for returning adaptive accelerator pedal map to default accelerator pedal map according to example aspects of the subject technology.
Figure 7B:
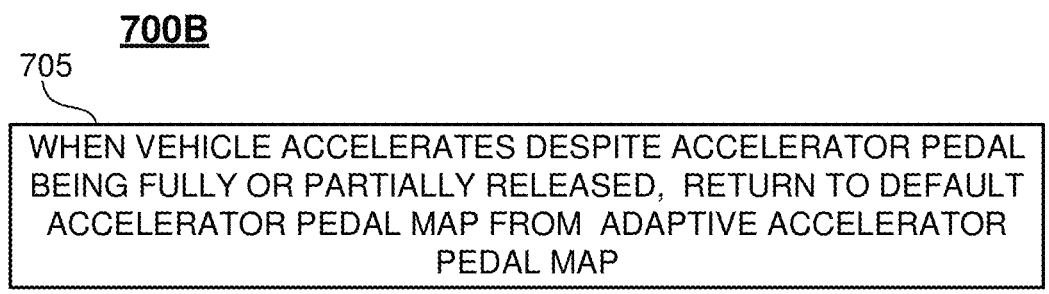

FIGS. 7A and 7B depict flow diagrams 700A and 700B of example processes for returning adaptive accelerator pedal map to default accelerator pedal map according to example aspects of the subject technology. For explanatory purposes, the example processes of FIGS. 7A and 7B are described herein with reference to the components of FIGS. 1, 2A-2F, 3A-3D, 4A-4D, and 5A-5D. Further for explanatory purposes, the blocks of the example process of FIG. 7A are described herein as occurring in serial, or linearly. However, multiple blocks of the example processes of FIG. 7A may occur in parallel. In addition, the blocks of the example process of FIG. 7A need not be performed in the order shown and/or one or more of the blocks of the example processes of FIG. 7A need not be performed.

In the flow diagram 700A of FIG. 7A, at block 701, in response to detecting the depression of the accelerator pedal to reaccelerate the vehicle according to the adjusted adaptive accelerator pedal map, controller 110 may further adjust the adjusted adaptive accelerator pedal map (i.e., adaptive accelerator pedal map 300C, 400C, or 500C) according to the change in the current speed and the position of accelerator pedal 150. For example, after detecting the depression of the accelerator pedal 150 to reaccelerate the vehicle according to adaptive accelerator pedal map 300C, controller 110 may further adjust the slope of coasting/deceleration boundary 280 as shown in adaptive accelerator pedal map 300D according to the change in the position of reacceleration point 240.

At block 703, when the further adjusted adaptive accelerator pedal map matches the default accelerator pedal map, controller 110 returns to the default accelerator pedal map from the further adjusted adaptive accelerator pedal map. For example, when the slope of coasting/deceleration boundary 280 in adaptive accelerator pedal map 300D matches the slope of coasting/deceleration boundary 280 in default accelerator pedal map 200A, controller 110 returns to default accelerator pedal map 200A from adaptive accelerator pedal map 300D. In some embodiments, when the slope of acceleration/coasting boundary 260 in adaptive accelerator pedal map 400D or adaptive accelerator pedal map 500D matches the slope of acceleration/coasting boundary 260 in default accelerator pedal map 200A, controller 110 returns to default accelerator pedal map 200A from adaptive accelerator pedal map 400D or adaptive accelerator pedal map 500D.

In the flow diagram 700B of FIG. 7B, at block 705, when the vehicle keeps accelerating despite the fact that accelerator pedal 150 is fully or partially released, controller 110 returns to the default accelerator pedal map from the adaptive accelerator pedal map. For example, when the driver of the vehicle fully or partially releases accelerator pedal 150 while driving a steep downhill and when the downhill force becomes greater than the counteracting force (i.e., braking force of the vehicle), the vehicle may accelerate despite the fact that accelerator pedal 150 is fully or partially released for deceleration. In such a situation, controller 110 returns to default accelerator pedal map 200A from any one of adaptive accelerator pedal maps 300A, 300C, 300D, 400A, 400C, 400D 500A, 500C, and 500D.

Figure 8:
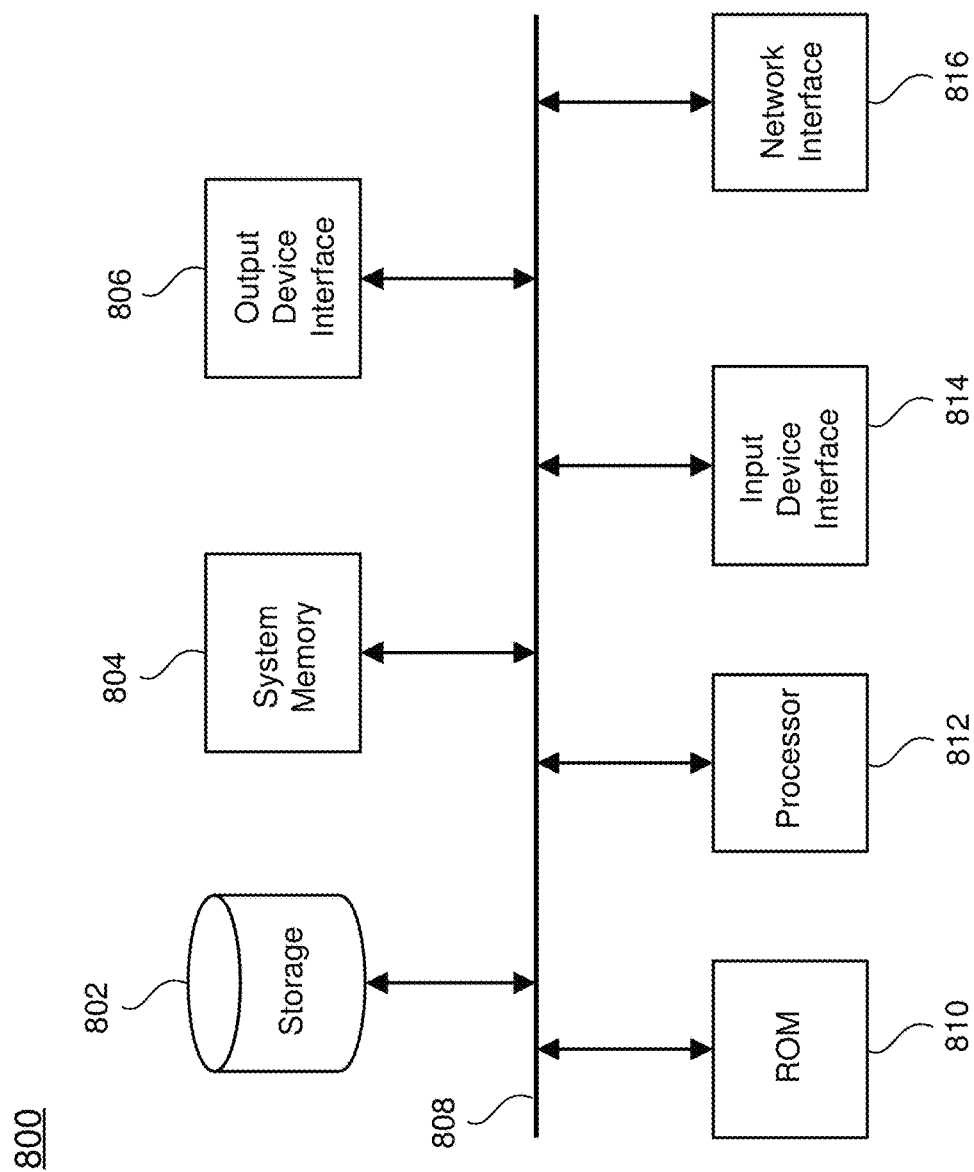
FIG. 8 is a block diagram illustrating an example electric system with which the powertrain control system of FIG. 1 can be implemented according to example aspects of the subject technology.

FIG. 8 is a block diagram illustrating an exemplary electronic system 800 with which controller 110 of FIG. 1 can be implemented to control the vehicle. In certain aspects, the electronic system 800 may be implemented using hardware or a combination of software and hardware, either in a dedicated electronic control unit (ECU), or integrated into another entity, or distributed across multiple entities. Electronic system 800 (e.g., controller 110) includes a bus 808, a processor 812, a system memory 804, a read-only memory (ROM) 810, a permanent storage device 802, an input device interface 814, an output device interface 806, and a network interface 816.

Bus 808 collectively represents all system, peripheral, and chipset buses that communicatively connect the numerous internal devices of electronic system 800. For instance, bus 808 communicatively connects processor 812 with ROM 810, system memory 804, and permanent storage device 802.

From these various memory units, processor 812 retrieves instructions to execute and data to process in order to execute the processes of the subject disclosure. The processor 812 can be a single processor or a multi-core processor in different implementations.

ROM 810 stores static data and instructions that are needed by processor 812 and other modules of the electronic system. Permanent storage device 802, on the other hand, is a read-and-write memory device. This device is a non-volatile memory unit that stores instructions and data even when electronic system 800 is off. Some implementations of the subject disclosure use a mass-storage device (for example, a magnetic or optical disk, or flash memory) as permanent storage device 802.

Other implementations use a removable storage device (for example, a flash drive) as permanent storage device 802. Like permanent storage device 802, system memory 804 is a read-and-write memory device. However, unlike storage device 802, system memory 804 is a volatile read-and-write memory, such as a random access memory. System memory 804 stores some of the instructions and data that the processor needs at runtime. In some implementations, the processes of the subject disclosure are stored in system memory 804, permanent storage device 802, or ROM 810. For example, the various memory units include instructions for displaying graphical elements and identifiers associated with respective applications, receiving a predetermined user input to display visual representations of shortcuts associated with respective applications, and displaying the visual representations of shortcuts. From these various memory units, processor 812 retrieves instructions to execute and data to process in order to execute the processes of some implementations.

Bus 808 also connects to input and output device interfaces 814 and 806. Input device interface 814 enables the user to communicate information and select commands to the electronic system. Input devices used with input device interface 814 include, for example, alphanumeric keyboards and pointing devices (also called "cursor control devices"). Output device interfaces 806 enables, for example, the display of images generated by the electronic system 800 (e.g., accelerator pedal maps). Output devices used with output device interface 806 include, for example, display devices, for example, cathode ray tubes (CRT) or liquid crystal displays (LCD). Some implementations include devices, for example, a touchscreen that functions as both input and output devices.

Finally, as shown in FIG. 8, bus 808 also couples electronic system 800 to a network (not shown) through a network interface 816. In this manner, the computer can be a part of a network of computers (for example, a CAN, a LAN, a WAN, or an Intranet, or a network of networks, for example, the Internet). Any or all components of electronic system 800 can be used in conjunction with the subject disclosure.

Many of the above-described features and applications are implemented as software processes that are specified as a set of instructions recorded on a computer readable storage medium (also referred to as computer readable medium). When these instructions are executed by one or more processors (e.g., one or more processors, cores of processors, or other processing units), they cause the processors to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Such electronic components are implemented by circuitry including, for example, one or more semiconductor integrated circuits. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself. ASICs and FPGAs are also implemented by semiconductor integrated circuits.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A computer-implemented method comprising:
   detecting a full release of an accelerator pedal of a vehicle while the vehicle travels at a first non-zero speed according to a default accelerator pedal map;
   in response to detecting the full release of the accelerator pedal while the vehicle travels at the first non-zero speed:
      controlling the vehicle to decelerate;
      switching the default accelerator pedal map to an adaptive accelerator pedal map, wherein the adaptive accelerator pedal map is different from the default accelerator pedal map;
      while the vehicle decelerates from the first non-zero speed after switching the default accelerator pedal map to the adaptive accelerator pedal map, adjusting the adaptive accelerator pedal map according to reduction of a speed of the vehicle; and
      when a depression of the accelerator pedal to reaccelerate the vehicle is detected at a second non-zero speed while the vehicle decelerates and before the speed of the vehicle reaches zero, controlling the vehicle to maintain a current speed of the vehicle or reaccelerate the vehicle according to the adjusted adaptive accelerator pedal map without further decelerating the vehicle, wherein the second non-zero speed is slower than the first non-zero speed.

2. The computer-implemented method of claim 1, further comprising further adjusting the adjusted adaptive accelerator pedal map in response to detecting a depression of the accelerator pedal.

3. The computer-implemented method of claim 2, wherein the adjusted adaptive accelerator pedal map is further adjusted according to a change in the current speed and a change in a degree of the depression of the accelerator pedal.

4. The computer-implemented method of claim 2, further comprising, when the further adjusted adaptive accelerator pedal map matches the default accelerator pedal map, returning to the default accelerator pedal map from the further adjusted adaptive accelerator pedal map.

5. The computer-implemented method of claim 2, further comprising, when the vehicle accelerates while the accelerator pedal is fully or partially released, returning to the default accelerator pedal map from the further adjusted adaptive accelerator pedal map.

6. The computer-implemented method of claim 1, further comprising, when the vehicle accelerates while the accelerator pedal is fully or partially released, returning to the default accelerator pedal map from the adaptive accelerator pedal map or from the adjusted adaptive accelerator pedal map.

7. The computer-implemented method of claim 1, wherein detecting the full release of the accelerator pedal of the vehicle while the vehicle travels at the first non-zero speed comprises detecting a depression on a brake pedal of the vehicle.

8. A system comprising:
   circuitry that perform operations comprising:
      detecting a full release of an accelerator pedal of a vehicle while the vehicle travels at a first non-zero speed according to a default accelerator pedal map;
      in response to detecting the full release of the accelerator pedal while the vehicle travels at the first non-zero speed:
         controlling the vehicle to decelerate;
         switching the default accelerator pedal map to an adaptive accelerator pedal map, wherein the adaptive accelerator pedal map is different from the default accelerator pedal map;
         while the vehicle decelerates from the first non-zero speed after switching the default accelerator pedal map to the adaptive accelerator pedal map, adjusting the adaptive accelerator pedal map according to reduction of a speed of the vehicle; and
         when a depression of the accelerator pedal to reaccelerate the vehicle is detected at a second non-zero speed while the vehicle decelerates and before the speed of the vehicle reaches zero, controlling the vehicle to maintain a current speed of the vehicle or reaccelerate the vehicle according to the adjusted adaptive accelerator pedal map without further decelerating the vehicle, wherein the second non-zero speed is slower than the first non-zero speed,
   wherein the operations further comprise:
      further adjusting the adjusted adaptive accelerator pedal map in response to detecting a depression of the accelerator pedal; and
      when the further adjusted adaptive accelerator pedal map matches the default accelerator pedal map, returning to the default accelerator pedal map from the further adjusted adaptive accelerator pedal map.

9. The system of claim 8, wherein the adjusted adaptive accelerator pedal map is further adjusted according to a change in the current speed and a change in a degree of the depression of the accelerator pedal.

10. The system of claim 8, wherein detecting the full release of the accelerator pedal of the vehicle while the vehicle travels at the first non-zero speed comprises detecting a depression on a brake pedal of the vehicle.

11. A system comprising:
circuitry that perform operations comprising:
detecting a full release of an accelerator pedal of a vehicle while the vehicle travels at a first non-zero speed according to a default accelerator pedal map;
in response to detecting the full release of the accelerator pedal while the vehicle travels at the first non-zero speed:
controlling the vehicle to decelerate;
switching the default accelerator pedal map to an adaptive accelerator pedal map, wherein the adaptive accelerator pedal map is different from the default accelerator pedal map;
while the vehicle decelerates from the first non-zero speed after switching the default accelerator pedal map to the adaptive accelerator pedal map, adjusting the adaptive accelerator pedal map according to reduction of a speed of the vehicle;
when a depression of the accelerator pedal to reaccelerate the vehicle is detected at a second non-zero speed while the vehicle decelerates and before the speed of the vehicle reaches zero, controlling the vehicle to maintain a current speed of the vehicle or reaccelerate the vehicle according to the adjusted adaptive accelerator pedal map without further decelerating the vehicle, wherein the second non-zero speed is slower than the first non-zero speed; and
when the vehicle accelerates while the accelerator pedal is fully or partially released, returning to the default accelerator pedal map from the adaptive accelerator pedal map or from the adjusted adaptive accelerator pedal map.

12. The system of claim 11, wherein the operations further comprising further adjusting the adjusted adaptive accelerator pedal map in response to detecting a depression of the accelerator pedal.

13. The system of claim 12, wherein the operations further comprising, when the vehicle accelerates while the accelerator pedal is fully or partially released, returning to the default accelerator pedal map from the further adjusted adaptive accelerator pedal map.

14. The system of claim 12, wherein the adjusted adaptive accelerator pedal map is further adjusted according to a change in the current speed and a change in a degree of the depression of the accelerator pedal.

15. The system of claim 12, wherein the operations further comprising, when the further adjusted adaptive accelerator pedal map matches the default accelerator pedal map, returning to the default accelerator pedal map from the further adjusted adaptive accelerator pedal map.

16. The system of claim 11, wherein detecting the full release of the accelerator pedal of the vehicle while the vehicle travels at the first non-zero speed comprises detecting a depression on a brake pedal of the vehicle.

* * * * *